(12) United States Patent
Horiguchi

(10) Patent No.: US 8,654,047 B2
(45) Date of Patent: Feb. 18, 2014

(54) ELECTRO-OPTIC DEVICE

(75) Inventor: Hirosada Horiguchi, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 964 days.

(21) Appl. No.: 12/389,703

(22) Filed: Feb. 20, 2009

(65) Prior Publication Data

US 2009/0231250 A1    Sep. 17, 2009

(30) Foreign Application Priority Data

Mar. 17, 2008  (JP) ................................. 2008-067202

(51) Int. Cl.
*G09G 3/34*      (2006.01)
(52) U.S. Cl.
USPC .................................. 345/84; 345/87; 345/102
(58) Field of Classification Search
USPC ....................................... 345/204, 102, 87, 84
See application file for complete search history.

(56) References Cited

U.S. PATENT DOCUMENTS

| 2004/0145560 A1* | 7/2004 | Kim ............................. 345/102 |
| 2004/0179003 A1* | 9/2004 | Jang ............................. 345/204 |
| 2005/0146532 A1 | 7/2005 | Miyazaki et al. |
| 2008/0018587 A1* | 1/2008 | Honbo et al. ................. 345/102 |

FOREIGN PATENT DOCUMENTS

| JP | 05-219462 | 8/1993 | |
| JP | 05219462 A * | 8/1993 | ............... H04N 5/66 |
| JP | 2005-195734 A | 7/2005 | |

* cited by examiner

*Primary Examiner* — Quan-Zhen Wang
*Assistant Examiner* — Troy Dalrymple
(74) *Attorney, Agent, or Firm* — ALG Intellectual Property, LLC

(57) ABSTRACT

An electro-optic device includes an electro-optic panel that includes a pixel region having a plurality of pixels arranged at a plurality of intersections where a plurality of scanning lines and a plurality of data lines cross each other, a polarity reverser that reverses, at a first frequency, a polarity of a video signal supplied to the plurality of pixels, a light source that emits light onto the pixel region, a pulse driver that pulse-drives the light source at a second frequency, and a setter that sets the first frequency and the second frequency so that a difference value between each of a plurality of first frequency components of the first frequency and each of a plurality of second frequency components of the second frequency is greater than a predetermined threshold value.

7 Claims, 17 Drawing Sheets

LIGHT LEVEL WITH WHITE DISPLAY PRESENTED (PANEL OFF)

LIGHT LEVEL WITH INTERMEDIATE GRADATION DISPLAY PRESENTED

FIG. 6
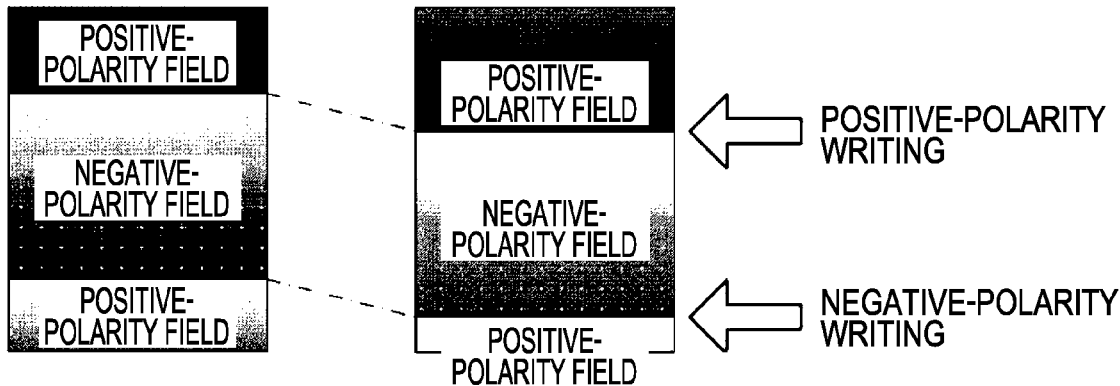
FIG. 7
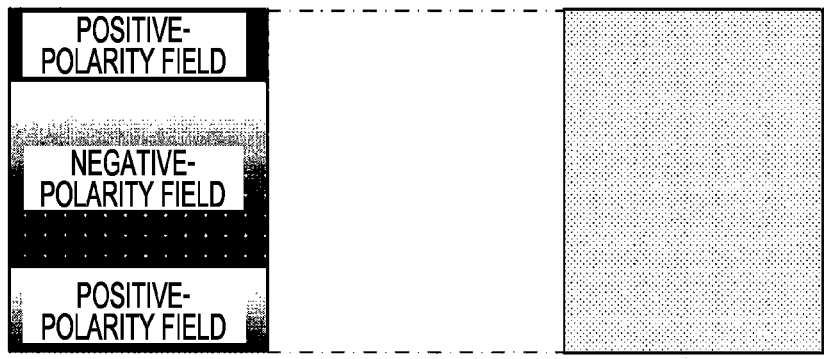
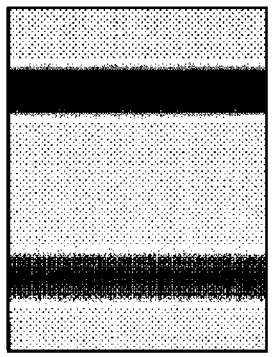

FIG. 9A

VALUE GROUP X1

| REVERSAL FREQUENCY OF LIQUID CRYSTAL (Hz) / PULSE FREQUENCY OF LIGHT SOURCE (Hz) | | 1ST 165 | 2ND 330 | 3RD 495 | 4TH 660 | |
|---|---|---|---|---|---|---|
| 1ST | 60 | 105 | 270 | 435 | 600 | ⎫ |
| 2ND | 120 | 45 | 210 | 375 | 540 | ⎪ |
| 3RD | 180 | 15 | 150 | 315 | 480 | ⎬ GROUP A |
| 4TH | 240 | 75 | 90 | 255 | 420 | ⎪ |
| 5TH | 300 | 135 | 30 | 195 | 360 | ⎪ |
| 6TH | 360 | 195 | 30 | 135 | 300 | ⎭ |
| 7TH | 420 | 255 | 90 | 75 | 240 | ⎫ GROUP B |
| 8TH | 480 | 315 | 150 | 15 | 180 | ⎭ |
| 9TH | 540 | 375 | 210 | 45 | 120 | ⎫ |
| 10TH | 600 | 435 | 270 | 105 | 60 | ⎪ GROUP C |
| 11TH | 660 | 495 | 330 | 165 | 0 | ⎬ |
| 12TH | 720 | 555 | 390 | 225 | 60 | ⎭ |

VALUE GROUP X2

FIG. 9B

| MINIMUM REVERSAL FREQUENCY OF LIQUID CRYSTAL WITHIN GROUP / PULSE FREQUENCY OF LIGHT SOURCE (Hz) | 1ST 165 | 2ND 330 | 3RD 495 | 4TH 660 |
|---|---|---|---|---|
| GROUP A | 15 | 30 | 135 | 300 |
| GROUP A+B | 15 | 30 | 15 | 180 |
| GROUP A+B+C | 15 | 30 | 15 | 0 |

RELATIONSHIP BETWEEN LAMP DRIVE FREQUENCY AND SCROLL NOISE

FIG. 12A
(COMPARATIVE EXAMPLE)

VALUE GROUP Y1

| REVERSAL FREQUENCY OF LIQUID CRYSTAL (Hz) \ PULSE FREQUENCY OF LIGHT SOURCE (Hz) | | 1ST 176 | 2ND 352 | 3RD 528 | 4TH 704 | |
|---|---|---|---|---|---|---|
| 1ST | 60 | 116 | 292 | 468 | 644 | ⎫ |
| 2ND | 120 | 56 | 232 | 408 | 584 | |
| 3RD | 180 | 4 | 172 | 348 | 524 | GROUP A |
| 4TH | 240 | 64 | 112 | 288 | 464 | |
| 5TH | 300 | 124 | 52 | 228 | 404 | |
| 6TH | 360 | 184 | 8 | 168 | 344 | ⎬ |
| 7TH | 420 | 244 | 68 | 108 | 284 | GROUP B |
| 8TH | 480 | 304 | 128 | 48 | 224 | |
| 9TH | 540 | 364 | 188 | 12 | 164 | |
| 10TH | 600 | 424 | 248 | 72 | 104 | GROUP C |
| 11TH | 660 | 484 | 308 | 132 | 44 | |
| 12TH | 720 | 544 | 368 | 192 | 16 | ⎭ |

VALUE GROUP Y2

FIG. 12B
(COMPARATIVE EXAMPLE)

| MINIMUM REVERSAL FREQUENCY OF LIQUID CRYSTAL WITHIN GROUP \ PULSE FREQUENCY OF LIGHT SOURCE (Hz) | 1ST 165 | 2ND 330 | 3RD 495 | 4TH 660 |
|---|---|---|---|---|
| GROUP A | 4 | 8 | 12 | 16 |
| GROUP A+B | 4 | 8 | 48 | 224 |
| GROUP A+B+C | 4 | 8 | 168 | 344 |

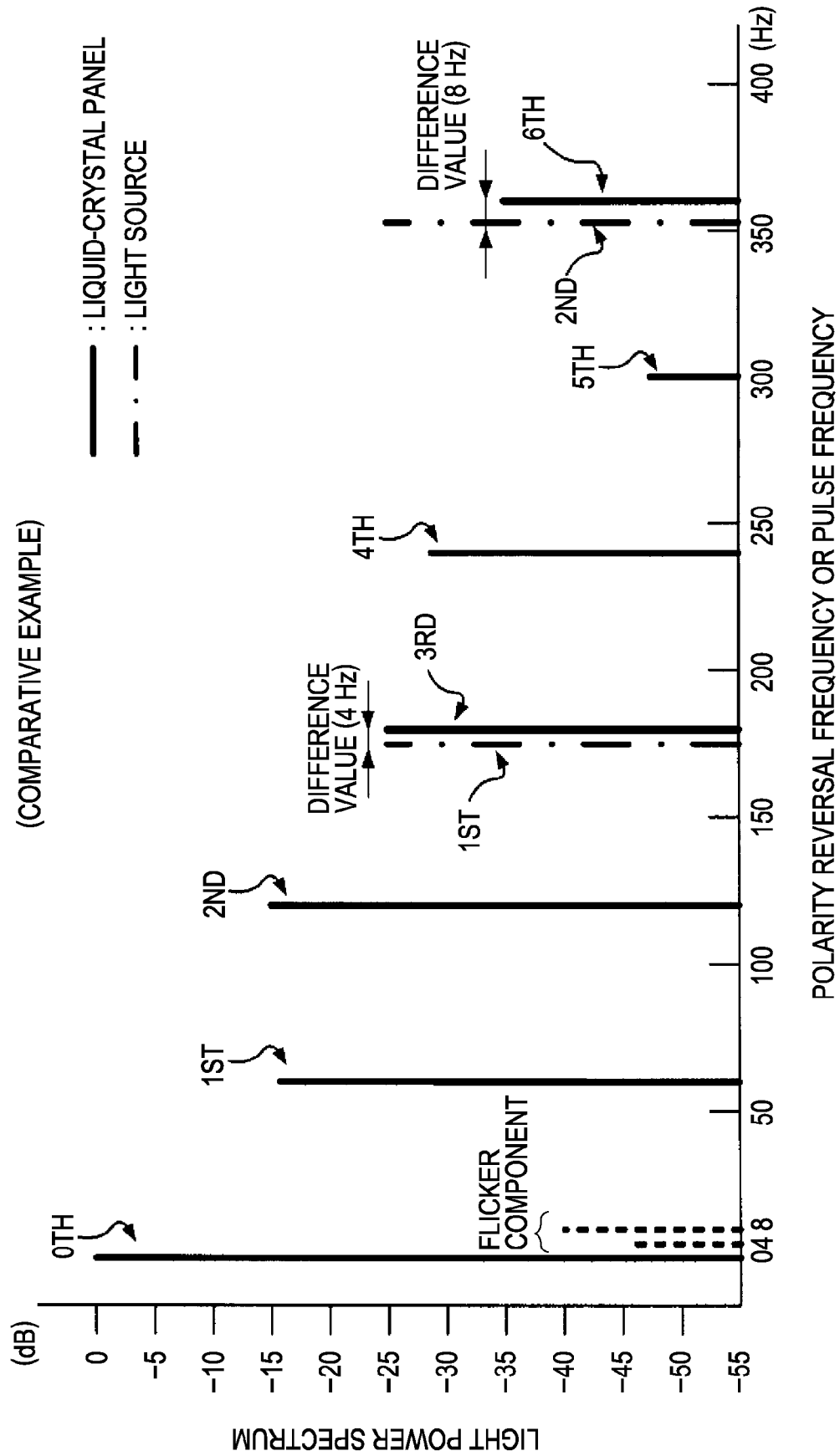

FIG. 14A

VALUE GROUP Y1

| REVERSAL FREQUENCY OF LIQUID CRYSTAL (Hz) \ PULSE FREQUENCY OF LIGHT SOURCE (Hz) | | 1ST 200 | 2ND 400 | 3RD 600 | 4TH 800 | |
|---|---|---|---|---|---|---|
| 1ST | 60 | 140 | 340 | 540 | 740 | ⎫ |
| 2ND | 120 | 80 | 280 | 480 | 680 | |
| 3RD | 180 | 20 | 220 | 420 | 620 | GROUP A |
| 4TH | 240 | 40 | 160 | 360 | 560 | |
| 5TH | 300 | 100 | 100 | 300 | 500 | |
| 6TH | 360 | 160 | 40 | 240 | 440 | ⎭ |
| 7TH | 420 | 220 | 20 | 180 | 380 | ⎱ GROUP B |
| 8TH | 480 | 280 | 80 | 120 | 320 | ⎰ |
| 9TH | 540 | 340 | 140 | 60 | 260 | ⎫ |
| 10TH | 600 | 400 | 200 | 0 | 200 | GROUP C |
| 11TH | 660 | 460 | 260 | 60 | 140 | |
| 12TH | 720 | 520 | 320 | 120 | 80 | ⎭ |

VALUE GROUP Y2

FIG. 14B

| MINIMUM REVERSAL FREQUENCY OF LIQUID CRYSTAL WITHIN GROUP \ PULSE FREQUENCY OF LIGHT SOURCE (Hz) | 1ST 200 | 2ND 400 | 3RD 600 | 4TH 800 |
|---|---|---|---|---|
| GROUP A | 20 | 40 | 240 | 440 |
| GROUP A+B | 20 | 20 | 120 | 320 |
| GROUP A+B+C | 20 | 40 | 0 | 80 |

FIG. 16A

| REVERSAL FREQUENCY OF LIQUID CRYSTAL (Hz) / PULSE FREQUENCY OF LIGHT SOURCE (Hz) | | 1ST 165 | 2ND 330 | 3RD 495 | 4TH 660 | |
|---|---|---|---|---|---|---|
| 1ST | 50 | 115 | 280 | 445 | 610 | |
| 2ND | 100 | 65 | 230 | 395 | 560 | |
| 3RD | 150 | <u>15</u> | 180 | 345 | 510 | GROUP A |
| 4TH | 200 | 35 | 130 | 295 | 460 | |
| 5TH | 250 | 85 | 80 | 245 | 410 | |
| 6TH | 300 | 135 | 30 | 195 | 360 | |
| 7TH | 350 | 185 | 20 | 145 | 310 | GROUP B |
| 8TH | 400 | 235 | 70 | 95 | 260 | |
| 9TH | 450 | 285 | 120 | 45 | 210 | |
| 10TH | 500 | 335 | 170 | 5 | 160 | GROUP C |
| 11TH | 550 | 385 | 220 | 55 | 110 | |
| 12TH | 600 | 435 | 270 | 105 | 60 | |

FIG. 16B

| MINIMUM REVERSAL FREQUENCY OF LIQUID CRYSTAL WITHIN GROUP / PULSE FREQUENCY OF LIGHT SOURCE (Hz) | 1ST 165 | 2ND 330 | 3RD 495 | 4TH 660 |
|---|---|---|---|---|
| GROUP A | <u>15</u> | 30 | 195 | 360 |
| GROUP A+B | <u>15</u> | 20 | 95 | 260 |
| GROUP A+B+C | <u>15</u> | 20 | <u>5</u> | 60 |

FIG. 17A
(COMPARATIVE EXAMPLE)

| REVERSAL FREQUENCY OF LIQUID CRYSTAL (Hz) \ PULSE FREQUENCY OF LIGHT SOURCE (Hz) | | 1ST | 2ND | 3RD | 4TH | |
|---|---|---|---|---|---|---|
| | | 200 | 400 | 600 | 800 | |
| 1ST | 50 | 150 | 350 | 550 | 750 | |
| 2ND | 100 | 100 | 300 | 500 | 700 | |
| 3RD | 150 | 50 | 250 | 450 | 650 | GROUP A |
| 4TH | 200 | <u>0</u> | 200 | 400 | 600 | |
| 5TH | 250 | 50 | 150 | 350 | 550 | |
| 6TH | 300 | 100 | 100 | 300 | 500 | |
| 7TH | 350 | 150 | 50 | 250 | 450 | GROUP B |
| 8TH | 400 | 200 | <u>0</u> | 200 | 400 | |
| 9TH | 450 | 250 | 50 | 150 | 350 | |
| 10TH | 500 | 300 | 100 | 100 | 300 | GROUP C |
| 11TH | 550 | 350 | 150 | 50 | 250 | |
| 12TH | 600 | 400 | 200 | 0 | 200 | |

FIG. 17B
(COMPARATIVE EXAMPLE)

| MINIMUM REVERSAL FREQUENCY OF LIQUID CRYSTAL WITHIN GROUP \ PULSE FREQUENCY OF LIGHT SOURCE (Hz) | 1ST | 2ND | 3RD | 4TH |
|---|---|---|---|---|
| | 165 | 330 | 495 | 660 |
| GROUP A | <u>0</u> | 100 | 300 | 500 |
| GROUP A+B | <u>0</u> | <u>0</u> | 200 | 400 |
| GROUP A+B+C | <u>0</u> | <u>0</u> | <u>0</u> | 200 | ately, the first frequency may be a vertical scanning
ELECTRO-OPTIC DEVICE

BACKGROUND

1. Technical Field

The present invention relates to an electro-optic device such a liquid-crystal projector.

2. Related Art

JP-A-5-219462 discloses a technique of synchronizing a period of a pulse driving a light source with a blanking period of a video signal in an electronic apparatus including an electro-optic device when the electro-optic device is driven with a polarity of the video signal reversed every frame.

Studies of the inventor of the invention show a technical problem in which the polarity reverse driving of the video signal interferes with the pulse driving of the light source, causing a band-like portion of a luminance difference (so-called scroll noise) to appear on a screen.

SUMMARY

An advantage of some aspects of the invention is that the generation of a luminance difference such as scroll noise is efficiently controlled.

According to a first aspect of the invention, an electro-optic device includes an electro-optic panel that includes a pixel region having a plurality of pixels arranged at a plurality of intersections where a plurality of scanning lines and a plurality of data lines cross each other, a polarity reverser that reverses, at a first frequency (polarity reversal frequency), a polarity, with respect to a common voltage, of a video signal supplied to the plurality of pixels, a light source that emits light onto the pixel region, a pulse driver that pulse-drives the light source at a second frequency (pulse frequency), and a setter that sets the first frequency and the second frequency so that a difference value between each of a plurality of first frequency components of the first frequency and each of a plurality of second frequency components of the second frequency is greater than a predetermined threshold value.

Light is thus directed from the light source to the pixel region of the electro-optic device during operation. The light emitted from the light source may be adjusted by a light adjuster to a light level to be directed to the pixel region. More specifically, the light level adjuster may adjust the light level of the light to a level appropriate to display an image on the pixel region. At the same time as or subsequent to the light direction to the pixel region, the video signal is supplied to the pixel region having the plurality of pixels respectively arranged at the plurality of intersections where the plurality of scanning lines and the plurality of data lines cross each other. The electro-optical panel with the pixel region having the plurality of pixels is thus driven. More specifically, a scanning signal is supplied via the scanning lines while the supply of the video signal from the data lines to the plurality of pixels is controlled. Image displaying is thus performed in a so-called active-matrix method. It is noted that the pixel contains a transparent electrode manufactured of an electrically conductive transparent material such as indium tin oxide (ITO) and that the plurality of pixels are arranged in a matrix in accordance with the intersections of the data lines and the scanning lines.

The polarity of the video signal to be supplied to the electro-optic panel is reversed by a polarity reverser at the first frequency. More specifically, the video signal alternates between a positive polarity and a negative polarity at the first frequency. The "first frequency" herein is typically a vertical scanning period in which an image of one frame is displayed.

Alternatively, the first frequency may be a vertical scanning period in which images of a plurality of fields forming one frame are displayed (including a red (R) field image, a green (G) field image and a blue (B) field image). In other words, 1-V reversal driving is performed in which the polarity is reversed every vertical scanning period. When the video signal driving is performed with the polarity of the video signal reversed, a luminance difference (vertical luminance non-uniformity) takes place along the data lines on the pixel region. The timing of the supplying of the video signal is different, depending on the position along the data line in the pixel region. This causes the voltage of the video signal to leak, leading to the luminance difference. For example, if the timing of the supplying of the video signal is different from pixel to pixel within one frame period or one field period, the voltage of the video signal becomes lower as the timing is later. A first luminance difference takes place due to the first frequency at which the polarity of the video signal is reversed. In a typical case, the first luminance difference may be understood as a difference between the luminance on a screen with the video signal being at one of the positive polarity and the negative polarity and the luminance on the screen with the video signal being at the other of the positive polarity and the negative polarity.

The pulse driver pulse-drives the light source at the second frequency and the light source emits the light to the pixel region. A second luminance difference takes place at the second frequency at which the light source is pulse-driven. More specifically, the second luminance difference may be understood as a difference between the luminance on the screen with the light source pulse-driven and the luminance on the screen with the light source not pulse-driven.

The setter sets the first frequency and the second frequency so that the difference value between each of the plurality of first frequency components of the first frequency and each of the plurality of second frequency components of the second frequency is greater than the predetermined threshold value. More specifically, let a, b, c, . . . represent the plurality of first frequency components, and A, B, C, . . . represent the plurality of second frequency components, and the differences may be a difference between a and A, a difference between a and B, a difference between a and C, . . . , a difference between b and A, a difference between b and B, a difference between b and C, . . . , a difference between c and A, a difference between c and B, a difference between c and C, . . . The predetermined threshold value in this specification refers to a difference value between the first frequency and the second frequency when scroll noise is visually recognized by humans. The predetermined threshold value may be individually and specifically defined by determining empirically, theoretically, in experience or in simulation whether the scroll noise is visually recognized by humans and by referring to the degree of visual recognition.

In this way, the above arrangement effectively controls synchronization or resonance between a first period and a second period, wherein with the first period, the first luminance difference appears on the screen due to the first frequency of the polarity reversal of the video signal, and with the second period, the second luminance difference appears on the screen due to the pulse frequency of the light source.

The generation of the scroll noise visually recognizable to human eyes is completely or almost completely controlled. High quality images thus result.

The electro-optic device of embodiments of the invention is applicable to a variety of electronic apparatuses including a projection-type display apparatus, a television receiver, a cell phone, an electronic notebook, a wordprocessor, a viewfinder type videocassette recorder, a direct-monitor-viewing type videocassette recorder, a workstation, a point-of-sale (POS) terminal, and a touchpanel. An electrophoresis device such as electronic paper may be embodied as the electro-optic device of embodiments of the invention.

According to the aspect of the invention, the first frequency is one of a frame frequency and a field frequency.

The polarity reverser reverses the polarity of the video signal every frame period or every field period. The electro-optic device of embodiments of the invention thus performs 1-V reverse driving.

If the polarity of the video signal is reversed every frame period or every field period, the luminance non-uniformity is likely to take place in the direction along the data line. In addition, the electro-optic device of embodiments of the invention effectively reduces not only the scroll noise but also the luminance non-uniformity in the direction along the data line. High-quality images are thus displayed.

In the electro-optic device of embodiments of the invention, the first frequency may be one of a frequency of the NTSC system (60 Hz) and a frequency of the PAL system (50 Hz).

When the polarity of the video signal is reversed at one of the frequency of the NTSC system and the frequency of the PAL system in accordance with the embodiment, the generation of the scroll noise visually recognizable by human eyes is completely or almost completely controlled.

In the electro-optic device of one embodiment of the invention, the setter may set the second frequency so that the difference value between each of the plurality of first frequency components of the frequency of the NTSC system and each of the plurality of second frequency components is greater than the predetermined threshold value and further set the second frequency so that the difference between each of the plurality of first frequency components of the frequency of the PAL system and each of the plurality of second frequency components is greater than the predetermined threshold value.

In accordance with the above-described embodiment, the generation of the scroll noise visually recognizable by human eyes is completely or almost completely controlled not only when the polarity of the video signal is reversed at the frequency of the NTSC system (60 Hz) but also when the polarity of the video signal is reversed at the frequency of the PAL system (50 Hz).

In the electro-optic device of another embodiment of the invention, a light power of the first frequency component may be higher than a predetermined value.

In accordance with the above-described embodiment, the light power of the first frequency component may be higher than the predetermined value. The predetermined value in the context of the specification refers to a value of the power of light on a screen visually recognizable by human eyes. The predetermined threshold value may be individually and specifically defined by determining empirically, theoretically, in experience or in simulation whether the scroll noise is visually recognized by humans and by referring to the degree of visual recognition.

It is thus unnecessary to pay much attention to the first frequency components having a light power lower than the predetermined value, and the first frequency and the second frequency are set more flexibly using the setter.

These and other operations and advantages will be apparent from the following description of the exemplary embodiments.

BRIEF DESCRIPTION OF THE DRAWINGS

The invention will be described with reference to the accompanying drawings, wherein like numbers reference like elements.

FIG. 6 diagrammatically illustrates a concept of the generation of a luminance difference on a video in accordance with the related art when a polarity of the voltage applied to a liquid crystal of a liquid-crystal panel is reverse-driven every field period.

FIG. 7 diagrammatically illustrates the principle on which scroll noise on the video is visually recognized by humans when a light source is pulse-driven in accordance with the related art.

FIG. 9A is a table listing difference values between frequency components of a polarity reversal frequency of the liquid crystal and frequency components of the pulse frequency of the light source in accordance with one embodiment of the invention and FIG. 9B is a table listing minimum values of the difference values on a per group basis of the frequency components of the polarity reversal frequency of the liquid crystal in accordance with one embodiment of the invention.

FIG. 12A is a table listing difference values between frequency components of a polarity reversal frequency of the liquid crystal and frequency components of the pulse frequency of the light source in accordance with a comparative example and FIG. 12B is a table listing minimum values of the difference values on a per group basis of the frequency components of the polarity reversal frequency of the liquid crystal in accordance with the comparative example.

FIG. 13 is a plot of a quantitative relationship of a light power spectrum of a frequency component of the polarity reversal frequency of the liquid crystal, a light power spectrum of the frequency component of the pulse frequency of the light source, and a light power spectrum of a flicker component caused by the scroll noise in accordance with the comparative example.

FIG. 14A is a table listing difference values between frequency components of a polarity reversal frequency of the liquid crystal and frequency components of the pulse frequency of the light source in accordance with a second embodiment of the invention and FIG. 14B is a table listing minimum values of the difference values on a per group basis of the frequency components of the polarity reversal frequency of the liquid crystal in accordance with the second embodiment of the invention.

FIG. 16A is a table listing difference values between frequency components of a polarity reversal frequency of the liquid crystal and frequency components of a pulse frequency of the light source in accordance with a third embodiment of the invention and FIG. 16B is a table listing minimum values of the difference values on a per group basis of the frequency components of the polarity reversal frequency of the liquid crystal in accordance with the third embodiment of the invention.

FIG. 17A is a table listing difference values between frequency components of a polarity reversal frequency of the liquid crystal and frequency components of a pulse frequency of the light source in accordance with a comparative example and FIG. 17B is a table listing minimum values of the difference values on a per group basis of the frequency components of the polarity reversal frequency of the liquid crystal in accordance with the comparative example.

DESCRIPTION OF EXEMPLARY EMBODIMENTS

The embodiments of the invention are described below with reference to the drawings.
Electro-Optic Device An electro-optic device of embodiments of the invention is described below with reference to FIGS. 1 through 11. In the following discussion of the embodiments, one example of the electro-optic device of embodiments of the invention is an active-matrix thin-film transistor (TFT) liquid-crystal device including a driver circuit.

Figure 1A:
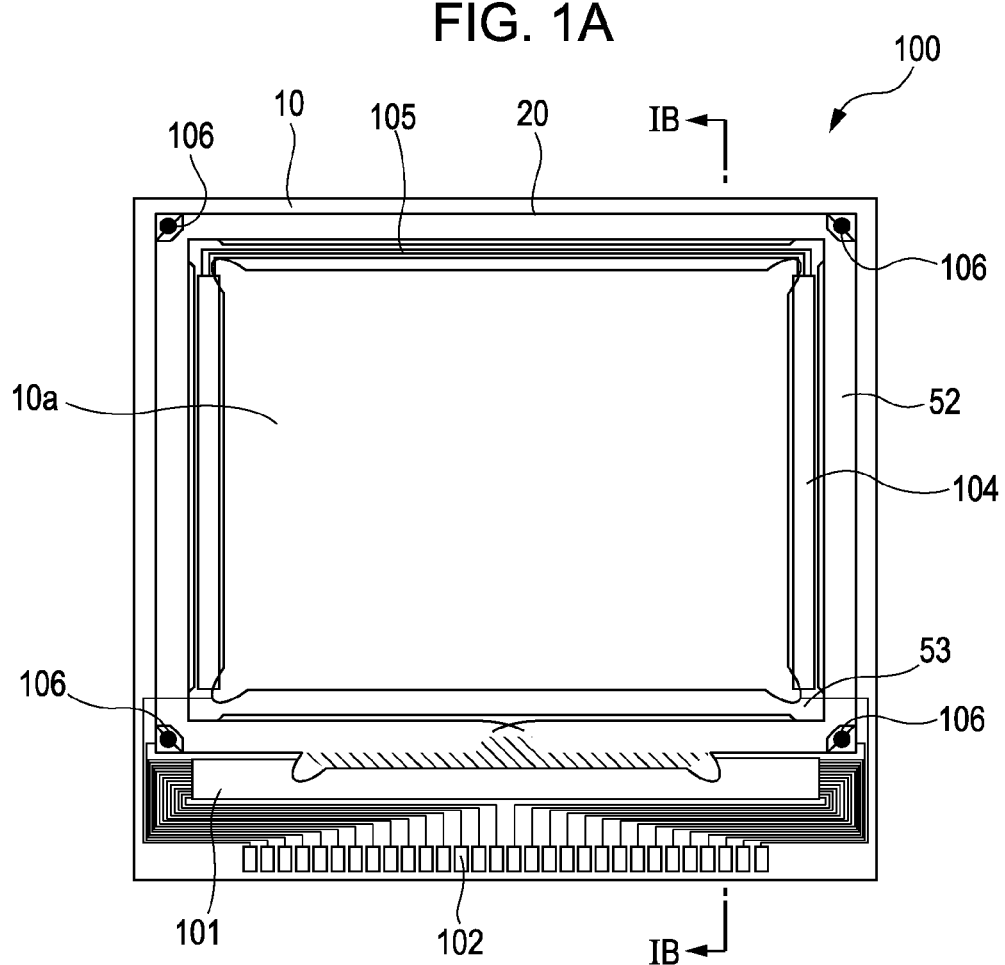
FIG. 1A is a plan view illustrating a the electro-optic panel in accordance with one embodiment of the invention and FIG. 1B is a sectional view of the electro-optic panel taken along line IB-IB in FIG. 1A.

A structure of the electro-optic panel of the electro-optic device of one embodiment of the invention is described with reference to FIGS. 1A and 1B. FIG. 1A is a plan view of the electro-optic panel and FIG. 1B is a sectional view of the electro-optic panel taken along line IB-IB in FIG. 1A.

Figure 1B:
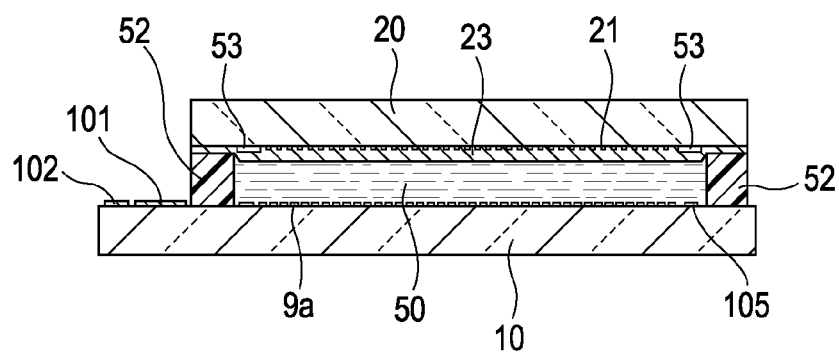

Referring to FIGS. 1A and 1B, the electro-optic panel 100 of one embodiment of the invention includes a TFT array substrate 10 and an opposed substrate 20 facing the TFT array substrate 10. The TFT array substrate 10 is a transparent substrate made of quartz, glass, or silicon. The opposed substrate 20 is also a transparent substrate. A liquid-crystal layer 50 is contained between the TFT array substrate 10 and the opposed substrate 20. The TFT array substrate 10 and the opposed substrate 20 are bonded to each other with a seal compound 52 arranged therebetween. The seal compound 52 is arranged along a seal area surrounding an image display region 10a having a plurality of pixel electrodes.

The seal compound 52 is made of an ultraviolet curable resin, a thermosetting resin, or the like, for bonding the two substrates. After being applied on the TFT array substrate 10 in a manufacturing process, the seal compound 52 is cured in ultraviolet irradiation, heating or in other process. The seal compound 52 includes a gap material, such as glass fiber or glass beads, in order to maintain to a predetermined value a substrate gap between the TFT array substrate 10 and the opposed substrate 20.

A frame outline light-shield film 53 defining the frame outline area of the image display region 10a is arranged on the opposed substrate 20 along the internal side of the seal area having the seal compound 52 arranged thereon. Alternatively, part or whole of the frame outline light-shield film 53 may be arranged as an internal light-shield film on the TFT array substrate 10.

A data line driver circuit 101 and external circuit connection terminals 102 are arranged outside and along one side of the seal area of the seal compound 52 on a periphery area. Scanning line driver circuits 104 are arranged adjacent to and along with two sides of the seal area of the seal compound 52 and covered with the frame outline light-shield film 53. To connect the two scanning line driver circuits 104 arranged on both sides of the image display region 10a, a plurality of wirings, covered with the frame outline light-shield film 53, are routed along the remaining side of the seal area of the seal compound 52.

Top-bottom connecting terminals 106 are arranged on the four corner portions of the TFT array substrate 10 facing the four corners of the opposed substrate 20 in order to connect the substrates via top-bottom conductive members 107. In this way, the TFT array substrate 10 is electrically connected to the opposed substrate 20.

With reference to FIG. 1B, an alignment layer is formed on pixel electrodes 9a on the TFT array substrate 10 with the pixel electrode 9a having pixel switching TFTs, scanning lines, and data lines formed thereon. The pixel electrode 9a is an electrically conductive transparent layer such as an ITO layer, and the alignment layer is an organic layer such as a polyimide layer. After forming a light-shield film 23 having a stripe or grid configuration on the opposed substrate 20, an opposed electrode 21 is formed on the entire surface of the light-shield substrate 23. An alignment layer is further formed as a top layer on the opposed electrode 21. The opposed electrode 21 is an electrically conductive transparent layer such as an ITO layer, and the alignment layer is an organic layer such as a polyimide layer. A liquid-crystal layer 50 is formed between the TFT array substrate 10 and the opposed substrate 20 so that the pixel electrodes 9a and the opposed electrode 21 faces each other. The liquid-crystal layer 50 is a mixture of at least one type of nematic liquid crystal or a plurality of types of nematic liquid crystal, and takes a predetermined alignment state between the pair of alignment layers.

The TFT array substrate 10 illustrated in FIGS. 1A and 1B includes driver circuits such as the data line driver circuit 101 and the scanning line driver circuit 104. The TFT array substrate 10 further includes a sampling circuit that samples a video signal on a video signal line and supplies the sampled video signal to the data lines, a pre-charge circuit that supplies to the plurality of data lines a pre-charge signal at a predetermined voltage level prior to the supplying of the video signal, and a test circuit that tests quality or fault of the electro-optic panel 100 in the middle of the manufacturing process thereof or at the shipment thereof.

Electro-Optic Panel

Figure 2:
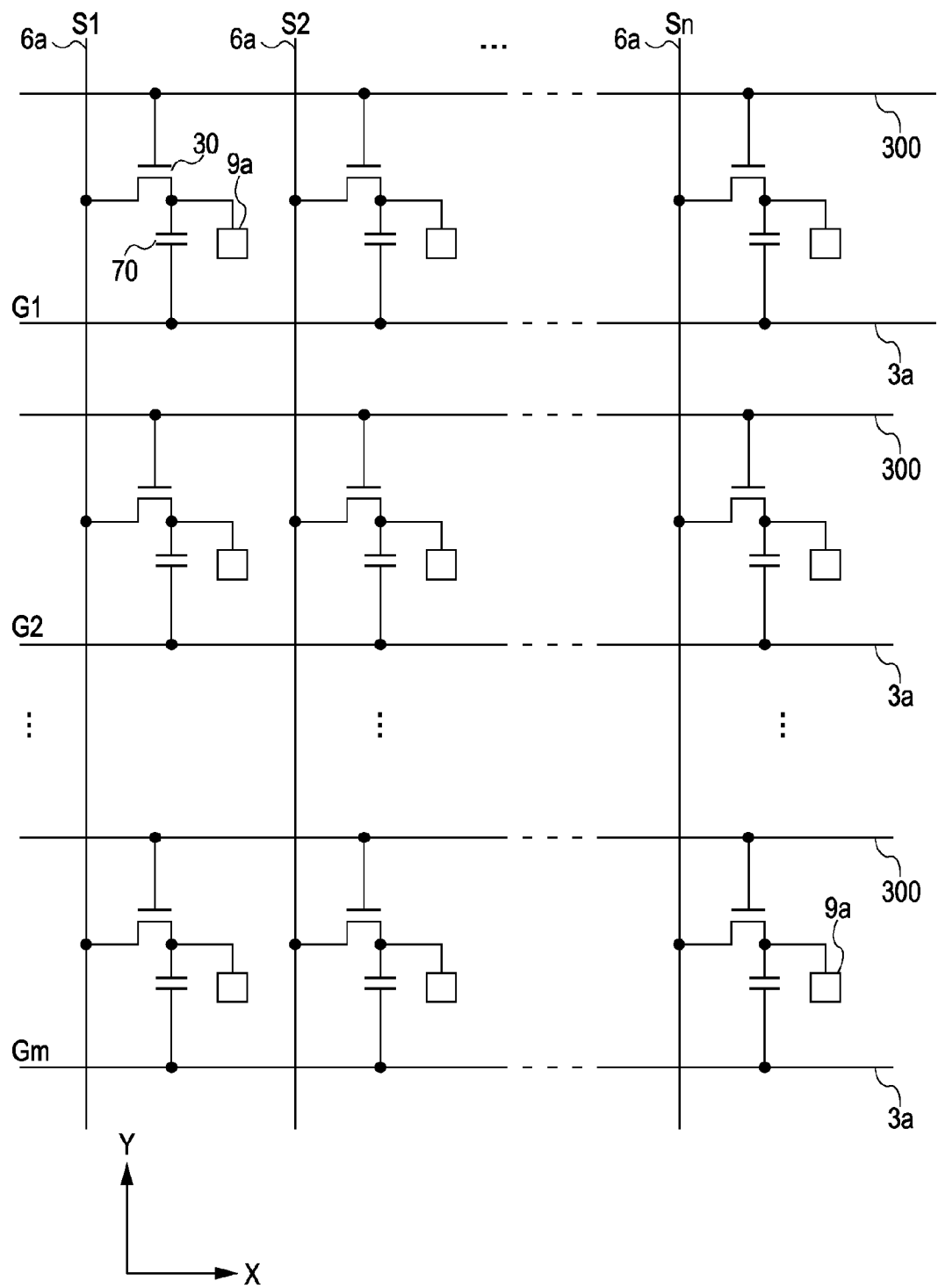
FIG. 2 is an equivalent circuit diagram illustrating elements and wirings in a plurality of pixels arranged in a matrix forming an image display region of the electro-optic panel in accordance with one embodiment of the invention.

An electrical structure of the pixels in the electro-optic panel 100 described above is described with reference to FIG. 2. FIG. 2 is an equivalent circuit diagram of elements, wirings, etc. of a plurality of pixels arranged in a matrix forming the image display region of the electro-optic panel 100 in accordance with one embodiment of the invention.

With reference to FIG. 2, the pixel electrode 9a and a thin-film transistor (TFT) 30 are arranged at each of the plurality of pixels arranged in a matrix forming the image display region 10a (see FIG. 1A). The TFT 30, electrically connected to the pixel electrode 9a, controls the pixel electrode 9a in a switching operation when the electro-optic device of one embodiment of the invention operates. A data line 6a supplied with the video signal is electrically connected to a source of the TFT 30. Video signals S1, S2, ..., Sn may be supplied to the data lines 6a on a line by line basis in that order, or may be supplied on a group by group basis with a plurality of adjacent data lines 6a supplied at a time.

A scanning line 3a is electrically connected to a gate of the TFT 30. The electro-optic panel 100 is so designed that the scanning lines 3a are supplied with scan signals G1, G2, ..., Gm in that order in the form of a pulse on a line by line basis at predetermined timings. The pixel electrode 9a is electrically connected to a drain of the TFT 30. By closing the TFT 30 as a switching element for a predetermined period, the video signals S1, S2, ..., Sn supplied via the data lines 6a are written on the liquid crystal at predetermined timings. The video signals S1, S2, ..., Sn at a predetermined level written on the liquid crystal as one of an electro-optic material through the pixel electrode 9a are held with an opposed electrode formed on the opposed substrate 20 for a constant period of time.

The liquid crystal forming the liquid-crystal layer 50 (see FIG. 1B) modulates light and presents gradation display when an alignment and order of a set of molecules vary in response to the level of an applied voltage. In a normally white mode, a transmittance ratio of the pixel to incident light is reduced in response to a voltage applied on a per pixel basis. In a normally black mode, a transmittance ratio of the pixel to incident light is increased in response to a voltage applied on a per pixel basis. The electro-optic panel generally emits light having a contrast responsive to the video signal.

A storage capacitor 70 is added in parallel with a liquid-crystal capacitor between the pixel electrode 9a and the opposed electrode 21 (see FIG. 1B) so that the held video signal is not leaked. The storage capacitor 70 temporarily hold the voltage of the pixel electrode 9a in response to the supply of the video signal. One electrode of the storage capacitor 70 is connected to the drain of the TFT 30 and the pixel electrode 9a while the other electrode thereof is connected to a capacitance line 300 fixed to a constant voltage so that the other electrode is maintained at the constant voltage. The storage capacitor 70 improves the hold characteristics of the voltage of the pixel electrode 9a, and thus provides display characteristic improvements, such as contrast improvement and flicker reduction.

Basic Structure of the Electronic Apparatus

Figure 3:
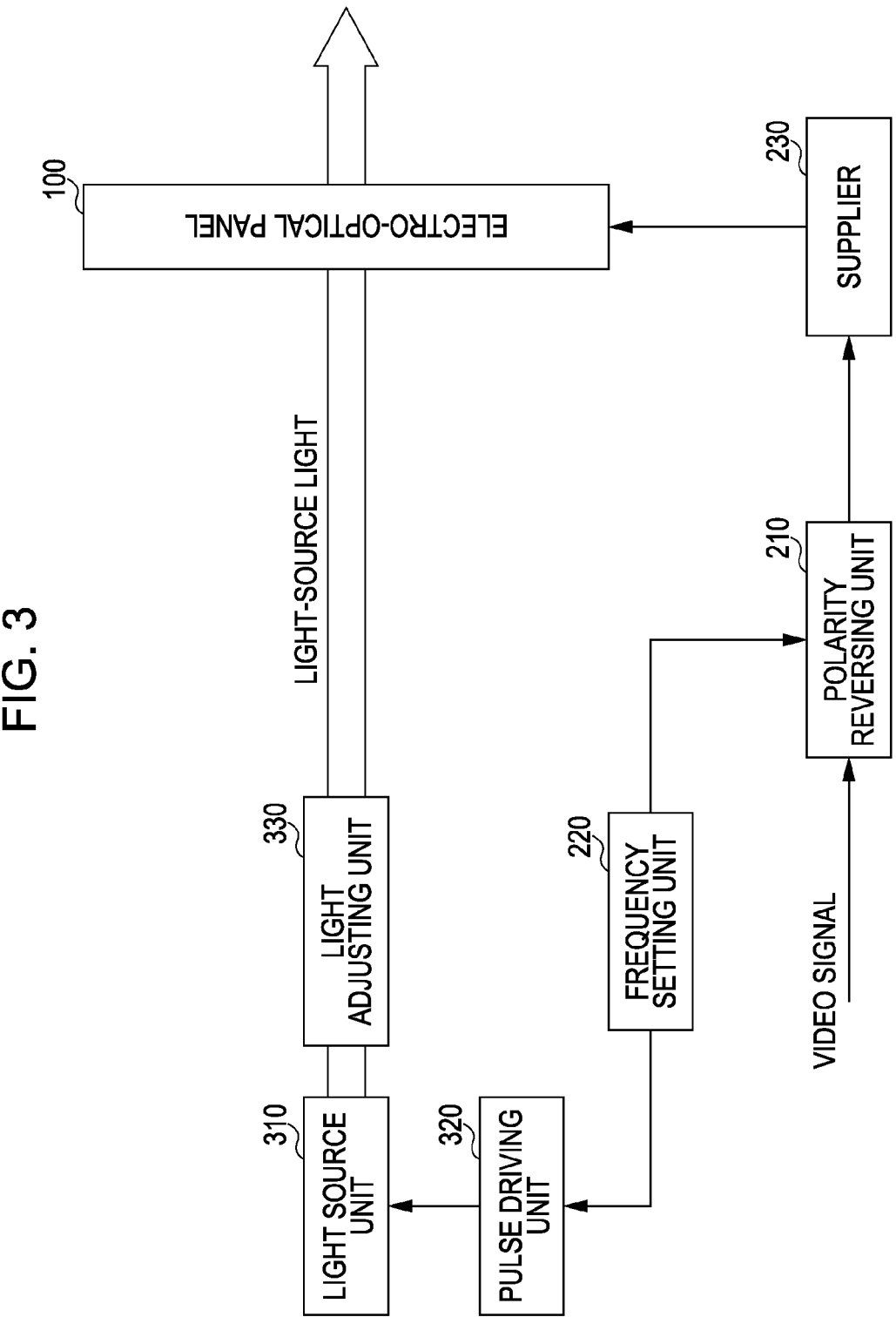
FIG. 3 is a block diagram illustrating a basic structure of an electronic apparatus containing the electro-optic device of one embodiment of the invention.

A basic structure of an electronic apparatus 1a containing the electro-optic device of one embodiment of the invention is described with reference to FIG. 3. FIG. 3 is a block diagram illustrating the basic structure of the electronic apparatus 1a containing the electro-optic device of one embodiment of the invention.

Referring to FIG. 3, the electronic apparatus 1a includes the above-described the electro-optic panel 100, a polarity reversing unit 210 as one example of the "polarity reverser" of one embodiment of the invention, a frequency setting unit 220 as one example of the "frequency setter" of one embodiment of the invention, a supplier 230, a light source unit 310 as one example of the "light source" of one embodiment of the invention, a pulse driving unit 320 as one example of the "pulse driver" of one embodiment of the invention, and a light adjusting unit 330.

The light source unit 310 is a halogen lamp or the like, and emits relatively high-intensity light at a predetermined pulse frequency toward the electro-optic panel 100 in the electro-optic device.

The pulse driving unit 320 pulse-drives the light source unit 310.

The light adjusting unit 330 is an aperture or a light adjusting shutter. The light adjusting unit 330 adjusts an amount of light directed from the light source unit 310 to the electro-optic panel 100. The light adjusting unit 330 may be of a type that controls the output of the light source unit 310 instead of a mechanical type that mechanically adjusts the amount of light.

The polarity reversing unit 210 includes a calculating circuit, a memory, etc., and reverses the polarity of an input video signal every predetermined period and outputs the reversed video signal.

The frequency setting unit 220 sets the polarity reversal frequency and the pulse frequency so that a difference value between each of a plurality of frequency components of the polarity reversal frequency of the polarity reversing unit 210 and a plurality of second frequency components of the pulse frequency of the light source unit 310 is greater than a predetermined threshold value. The frequency setting unit 220 then outputs the information relating to the difference value to each of the polarity reversing unit 210 and the pulse driving unit 320. The predetermined threshold value in one embodiment of the invention may be a difference value between the polarity reversal frequency and the pulse frequency at which scroll noise and flickering are visually recognized by human eyes. The predetermined threshold value may be individually and specifically defined by determining empirically, theoretically, in experience or in simulation whether the scroll noise is visually recognized by humans and by referring to the degree of visual recognition. The polarity reversal frequency of the liquid crystal and the pulse frequency of the light source will be described in detail later. The scroll noise in this embodiment refers to a luminance difference band visually recognizable on the screen by human eyes caused by synchronization or resonance between a first period and a second period. Here, the first period is that of a first luminance difference that appears on the screen due to the polarity reversal frequency of the liquid crystal and the second period is that of a second luminance difference that appears on the screen due to the pulse frequency of the light source. In a typical case, the first luminance difference may be understood as a difference between the luminance on a screen with the video signal being at one of the positive polarity and the negative polarity and the luminance on the screen with the video signal being at the other of the positive polarity and the negative polarity. The second luminance difference may be understood as a difference between the luminance on the screen with the light source pulse-driven and the luminance on the screen with the light source not pulse-driven.

The supplier 230, including wirings, etc. electrically connected to the electro-optic panel 100, supplies the video signal to the electro-optic panel 100.

The above-described polarity reversing unit 210, frequency setting unit 220 and supplier 230 may be arranged as a circuit external to the electro-optic panel 100, or may be formed on the TFT array substrate 10 in the electro-optic panel 100.

Operational Principle

Figure 4:
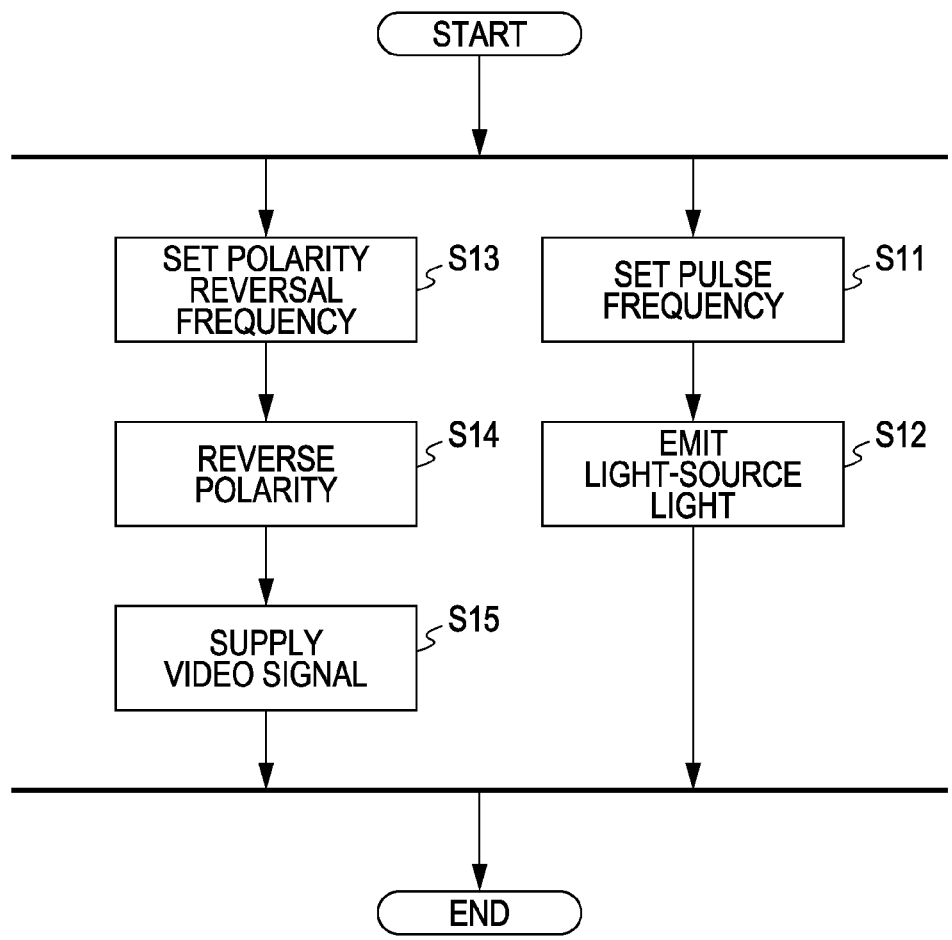
FIG. 4 is a flowchart illustrating an operation of the electronic apparatus containing the electro-optic device of one embodiment of the invention.

Operation and effects of the electronic apparatus containing the electro-optic device of one embodiment of the invention are described with reference to FIGS. 3 and 4. FIG. 4 is a flowchart of the operation of the electronic apparatus containing the electro-optic device of one embodiment of the invention.

When the electronic apparatus starts in FIG. 4, the pulse driving unit 320 sets the pulse frequency of the light source unit 310 (step S11).

The light source unit 310 then emits a light-source light (step S12). More specifically, the light-source light is directed to the electro-optic panel 100 in the electro-optic device.

At the same time as or in succession to the light irradiation, the frequency setting unit 220 sets the polarity reversal frequency of the polarity reversing unit 210 (step S13).

The polarity reversing unit 210 reverses the polarity of the video signal every predetermined period while outputting the polarity reversed video signal (step S14). In a typical operation, the polarity reversing unit 210 reverses the polarity of the video signal every vertical scanning period in which an image of one frame is displayed or every vertical scanning period in which an image of a plurality of fields forming one frame is displayed. This 1-V reversal driving method reduces an amplitude of the video signal, thereby leading to power saving.

The supplier 230 supplies the video signal to the electro-optic panel 100 (step S15). The above steps (steps S11 through S15) are repeated, and the electro-optic device of one embodiment of the invention is driven. The video signal is supplied to the electro-optic panel 100 and the light-source light is directed to the image display region 10a of the electro-optic panel 100 (see FIG. 1A). An image as a projected image or a direct-viewed image is thus displayed.

Generation Principle of Scroll Noise

A typical generation principle of the scroll noise likely to be generated in the above-described image display region 10a is described below with reference to FIGS. 5A and 5B through 8A and 8B.

Figure 5A:
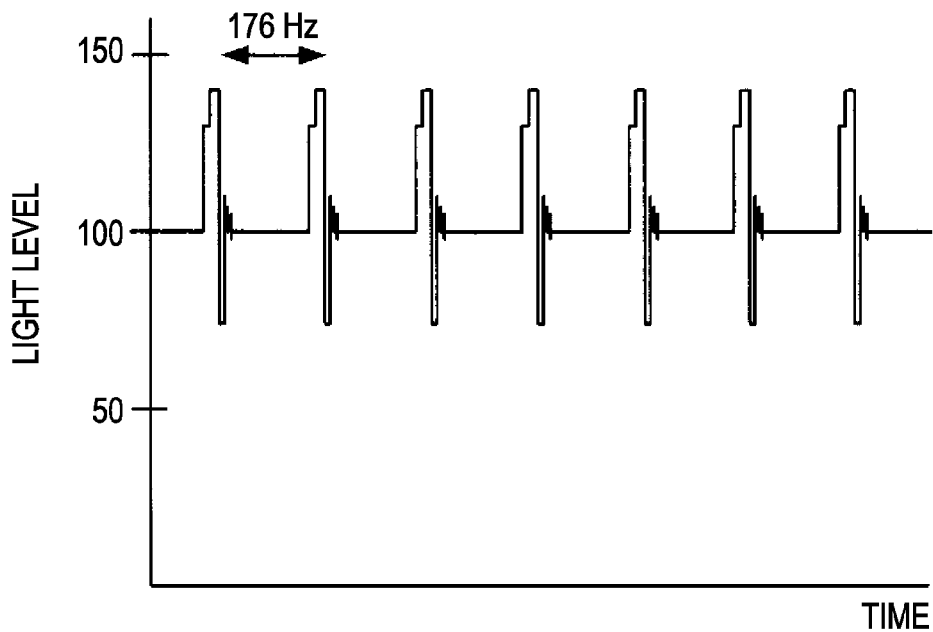
FIG. 5A is a plot of a light level changing with time with a liquid-crystal panel displaying a white display in accordance with the related art.
Figure 5B:
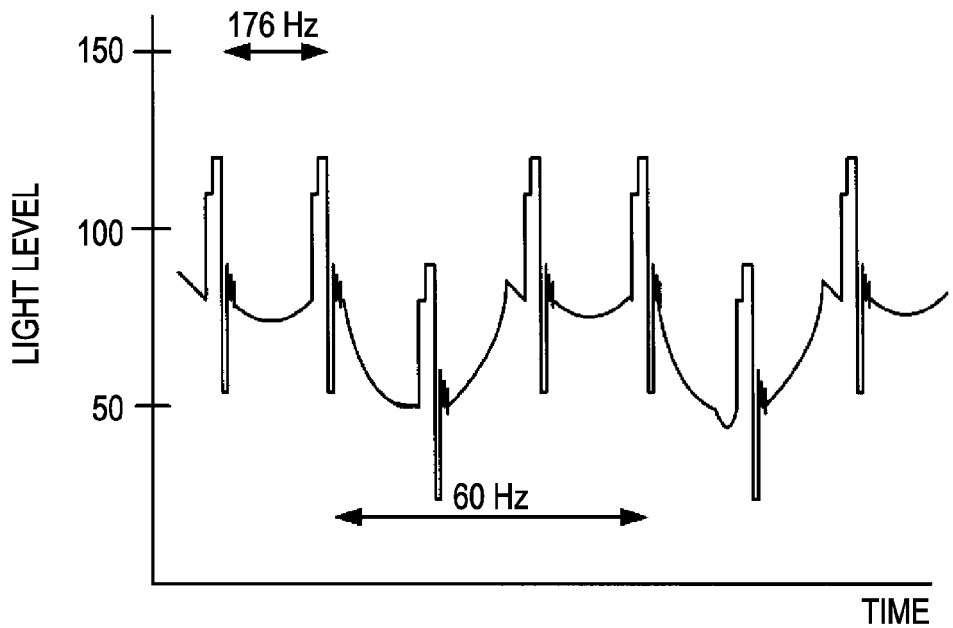
FIG. 5B is a plot of a light level changing with time with the liquid-crystal panel displaying a gray display, i.e., an intermediate gradation display in accordance with the related art.

Case in which the Luminance Difference is not Recognized on the Electro-Optic Panel The general cause of the generation of the luminance difference on the liquid-crystal panel is described with reference to FIGS. 5A and 5B and 6. FIG. 5A is a plot of a light level changing with time with a liquid-crystal panel displaying a white display in accordance with the related art, and FIG. 5B is a plot of a light level changing with time with the liquid-crystal panel displaying a gray display, i.e., an intermediate gradation display in accordance with the related art. FIG. 6 diagrammatically illustrates a concept of the generation of a luminance difference on a video in accordance with the related art when a polarity of the voltage applied to a liquid crystal of the liquid-crystal panel is reverse-driven every field period.

As illustrated in FIG. 5A, the light level changes in a pulse by 140% every time interval of "1/176 (second)" corresponding to a period of 176 Hz as a pulse frequency at which the light source is pulse-driven, when the normally-white electro-optic panel 100 is driven in the white display, i.e., in an off-state in which no voltage is applied to the electro-optic panel 100. The pulse frequency of 176 Hz is typically twice as high as the driving frequency of 88 Hz of the light source unit 310 such as a lamp.

When the electro-optic panel 100 presents an intermediate gradation display such as a gray display, the polarity of the voltage applied to the liquid crystal of the electro-optic panel 100 at 60 Hz in the NTSC system is reverse-driven every field. Optical leak occurs every field. As illustrated in FIG. 5B, it is known that the light level of the light transmitting through the electro-optic panel 100 changes even if a common electrode (VCOM) is appropriately adjusted.

In the drive method of reverse-driving every field, i.e., a region scanning drive method, the liquid crystal of the electro-optic panel 100 is alternately driven by a positive voltage and a negative voltage every field. In other words, the polarity of the data signal is reversed every field.

One field is first considered. At the moment a video at an intermediate gradation level such as gray level is displayed in the field, the video is at the darkest luminance level immediately after the writing of the data signal. On the other hand, the video is at the brightest luminance level immediately prior to the writing of the data signal. For this reason, there is a possibility that a luminance difference band appears horizontally on the video at a given time.

A field with a positive polarity voltage applied (positive polarity field) and a field with a negative polarity voltage applied (negative polarity field) are considered next. A luminance difference takes place between the luminance of the positive polarity field and the luminance of the negative polarity field. The luminance difference in this case is different depending on the amount of light leak on the electro-optic panel 100. More specifically, the luminance difference increases as the amount of light leak increases, and the luminance difference decreases as the amount of light leak decreases. Furthermore, the amount of light leak is different from the positive polarity field to the negative polarity field. As a result, the luminance difference takes place on the video between the positive polarity field and the negative polarity field.

The luminance difference takes place on the video image between the positive polarity field and the negative polarity field in addition the luminance difference taking place on the video image on the field itself. These luminance differences are repeated or scrolled at 60 Hz in the NTSC system, for example, and are generally visually not recognized by human eyes.

Figure 8A:
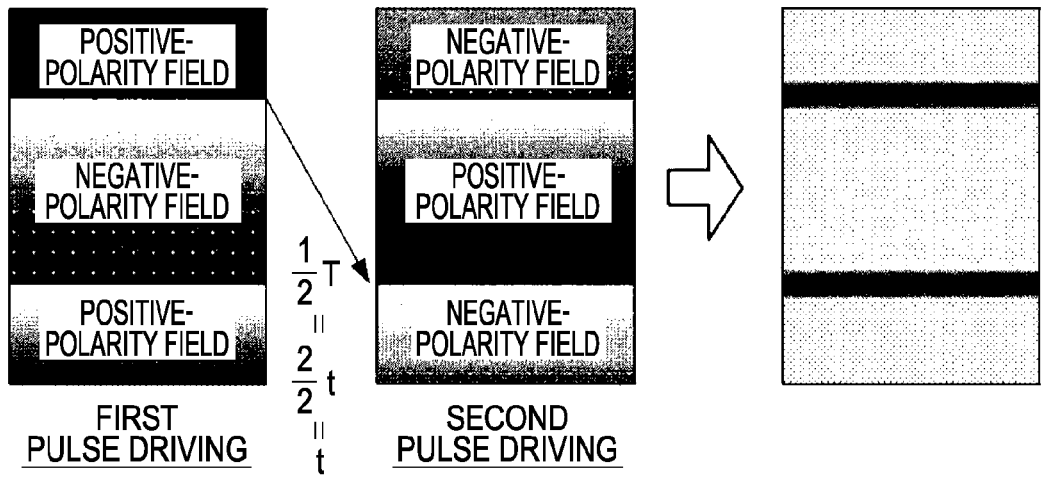
FIGS. 8A and 8B diagrammatically illustrate a correlation between the number of bands on the video visually recognized by humans and a pulse frequency when the light source is pulse-driven in accordance with the related art.
Figure 8B:
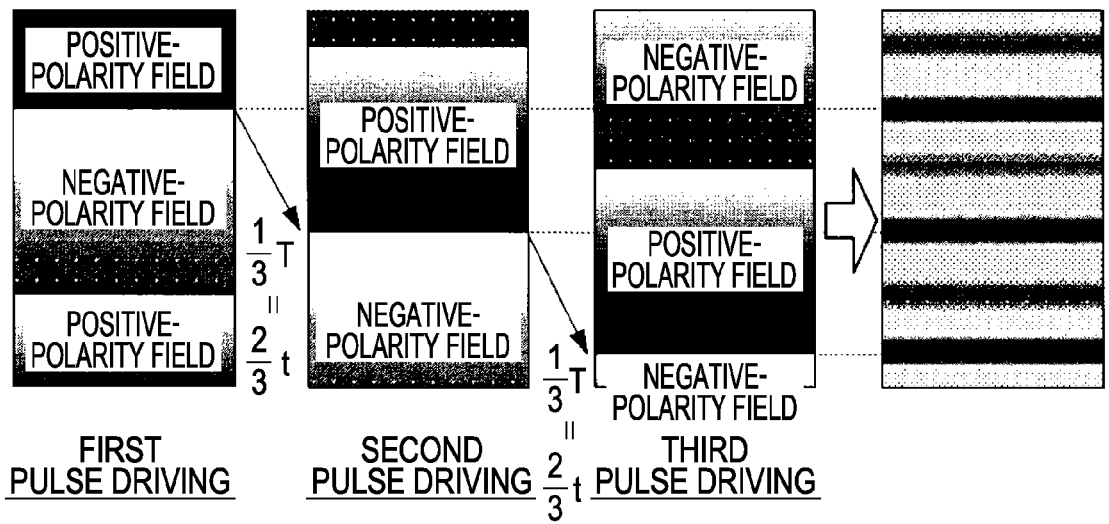

General Principle on which the Luminance Difference is Visually Recognized in Response to Pulse Driving of the Light Source Unit and on the Electro-Optic Panel Discussed with reference to FIGS. 7 and 8A and 8B is the general principle on which the luminance is visually recognized in view of the pulse driving of the light source unit and the electro-optic panel. FIG. 7 diagrammatically illustrates the principle on which scroll noise on the video is visually recognized by humans when a light source is pulse-driven in accordance with the related art. FIGS. 8A and 8B diagrammatically illustrate a correlation between the number of bands on the video visually recognized by humans and a pulse frequency when the light source is pulse-driven in accordance with the related art.

Referring to the upper left portion of FIG. 7, the pulse-driven light source generally provide a video contrast in a pulse-driven period higher than a video contrast in a no-pulse-driven period. Referring to the upper right portion of FIG. 7, the video contrast is averaged in the no-pulse-driven period. In particular, when the light source is pulse-driven with a regular period or at a predetermined frequency, a video is periodically generated at the moment the light source is pulse-driven, and a luminance difference band may be consecutively recognized by human eyes. The size of the luminance difference band is correlated with the pulse frequency at which the light source is pulse-driven. If the pulse frequency of the light source is completely synchronized with the field frequency of the video, a portion where the luminance difference band takes place appears to be stationary on the video. If the pulse frequency of the light source is slightly different from the field frequency of the video, the portion where the luminance difference band takes place appears to scroll on the video. As illustrated in FIG. 7, the pulse frequency is in the vicinity of 60 Hz. The scroll noise or flickering generally takes place in this way.

The video signals S1, S2, . . . , Sn output from the data line driver circuit 101 are typically alternately reversed between the positive polarity voltage and the negative polarity voltage with respect to a common voltage every horizontal period. The video signals S1, S2, . . . , Sn are typically alternately reversed every horizontal period while the scanning lines G1-Gm are alternately output at two of scanning lines 3a, the two scanning line spaced apart by m lines on the screen. One horizontal period is now considered, for example. A pixel scanned along one scanning line becomes a portion having positive voltage data written thereon, and another pixel scanned along another scanning line becomes a portion having negative voltage data written thereon. The entire screen is thus partitioned into positive polarity areas and negative polarity areas. More specifically, during a first horizontal period, a 2m-th scanning line 11a is scanned by a scanning signal G2m, and a negative voltage video signal is written on a pixel. During a second horizontal period, a (m+1)-th scanning line 11a is scanned by a scanning signal Gm+1 and a positive voltage video signal is written on a pixel that was at a negative voltage during the first horizontal period. During a third horizontal period, a first scanning line 11a is scanned by a scanning signal G1 and a negative voltage video signal is written on a pixel that was at a positive voltage during the first and second horizontal periods. The selective writing operation described above is thereafter repeated. When half the screen is scanned, the positive polarity area and the negative polarity area are completely reversed, and then the one full screen has completely undergone the writing process. In accordance with this method, the refreshing of the full screen is performed twice. The above-described electro-optic device of one embodiment of the invention performs the "region scanning" drive method during displaying.

If the polarity reversal frequency of the polarity of the voltage applied to the liquid crystal of the electro-optic panel is 60 Hz and the pulse frequency of the light source is 60 Hz, the light source is pulse-driven at time intervals, each equal to a field period t at which the polarity of the electro-optic panel is reversed. More specifically, FIG. 8A illustrates first pulse driving and second pulse driving that takes place one field period t after the first pulse driving. Two luminance difference bands at approximately equal darkness level on the video are visually recognized by human eyes on a border between the positive polarity field and the negative polarity field during the first pulse driving and on a border between the positive polarity field and the negative polarity field during the second pulse driving. The two luminance difference bands are thus visually recognized by human eyes. With reference to FIG. 8A, let T represent the frame period of the frame composed of two fields and t represent the field period.

If the polarity reversal frequency of the polarity of the voltage applied to the liquid crystal of the electro-optic panel is 60 Hz and the pulse frequency of the light source is 90 Hz, the light source is pulse-driven at time intervals, each equal to two thirds of the field period t (i.e., 2t/3) at which the polarity of the electro-optic panel is reversed. More specifically, FIG. 8B illustrates first pulse driving and second pulse driving that takes place two thirds of one field period t after the first pulse driving. FIG. 8B further illustrates third driving that takes place two thirds of one field period t after the second pulse driving.

Three luminance difference bands at approximately equal darkness level on the video are visually recognized by human eyes, one band on a border between the positive polarity field and the negative polarity field during the first pulse driving, another on a border between the positive polarity field and the negative polarity field during the second pulse driving, and the third on a border between the positive polarity field and the negative polarity field during the third pulse driving. Furthermore, three luminance difference bands at approximately equal darkness level on the video are visually recognized by human eyes, one band on a border between the negative polarity field and the positive polarity field during the first pulse driving, another on a border between the negative polarity field and the positive polarity field during the second pulse driving, and the third on a border between the negative polarity field and the positive polarity field during the third pulse driving. In this way, a total of six luminance difference bands, i.e., three bands of one luminance difference and three bands of the other luminance difference, are visually recognized by human eyes. Whether the bands of one luminance difference may be darker or lighter than the bands of the other luminance difference may be determined by the amount of light leak of the electro-optic panel in addition to or instead of the writing timing of the data signal.

Polarity Reversal Frequency of the Liquid Crystal and Pulse Frequency of the Light Source Discussed below with reference to FIGS. 9A and 9B through 13 are examples of the luminance difference between the polarity reversal frequency at which the polarity of the voltage applied to the liquid crystal of the electro-optic panel 100 of one embodiment of the invention is reversed, and the pulse frequency at which the light source unit 310 is pulse-driven. FIG. 9A is a table listing difference values between frequency components of the polarity reversal frequency of the liquid crystal and frequency components of the pulse frequency of the light source in accordance with one embodiment of the invention and FIG. 9B is a table listing minimum values of the difference values on a per group basis of the frequency components of the polarity reversal frequency of the liquid crystal in accordance with one embodiment of the invention.

When the frequency component of the polarity reversal frequency of the voltage applied to the liquid crystal of the electro-optic panel 100 is set based on 60 Hz as illustrated in FIG. 9A, the frequency component of the pulse frequency at which the light source is pulse-driven is set based on 165 Hz. More specifically, the frequency components of the polarity reversal frequency of the liquid crystal of the electro-optic panel 100 contain integer multiples of 60 Hz from the first through twelfth components, including 60, 120, 180, . . . , 540, 600, 660, and 720 Hz, as frequency examples of the NTSC system in accordance with one embodiment of the invention.

The frequency components of the pulse frequency of the light source contains integer multiples of 165 Hz, namely, the first through fourth frequency components of 165, 330, 495, and 660 Hz. In this way, the plurality of frequency components of the polarity reversal frequency of the liquid crystal are compared with the frequency components of the pulse frequency of the light source in accordance with one embodiment of the invention. The difference value of each of the frequency components of the polarity reversal frequency of the liquid crystal and each of the frequency components of the pulse frequency of the light source is thus calculated as listed in the table of FIG. 9A.

Group A

As illustrated in FIG. 9A, a difference value between the first frequency component 60 Hz of the polarity reversal frequency of the liquid crystal and the first frequency component 165 Hz of the pulse frequency of the light source is 105 Hz in the group A containing the first through sixth frequency components of the polarity reversal frequency of the liquid crystal. Similarly, a difference value between the third frequency component 180 Hz of the polarity reversal frequency of the liquid crystal and the first frequency component 165 Hz of the pulse frequency of the light source is 15 Hz. A value group X1 in the table of FIG. 9A will be described later. A difference value between the fifth frequency component 300 Hz of the polarity reversal frequency of the liquid crystal and the second frequency component 330 Hz of the pulse frequency of the light source is 30 Hz. A difference value between the sixth frequency component 360 Hz of the polarity reversal frequency of the liquid crystal and the second frequency component 330 Hz of the pulse frequency of the light source is 30 Hz. A difference value between the sixth frequency component 360 Hz of the polarity reversal frequency of the liquid crystal and the third frequency component 495 Hz of the pulse frequency of the light source is 135 Hz. A difference value between the sixth frequency component 360 Hz of the polarity reversal frequency of the liquid crystal and the second frequency component 660 Hz of the pulse frequency of the light source is 300 Hz.

Group B

As illustrated in FIG. 9A, a difference value between the eighth frequency component 480 Hz of the polarity reversal frequency of the liquid crystal and the third frequency component 495 Hz of the pulse frequency of the light source is 15 Hz in the group B containing the seventh and eighth frequency components of the polarity reversal frequency of the liquid crystal. A value group X2 of FIG. 9A will be described later. A difference value between the eighth frequency component 480 Hz of the polarity reversal frequency of the liquid crystal and the fourth frequency component 660 Hz of the pulse frequency of the light source is 180 Hz.

Group C

As illustrated in FIG. 9A, a difference value between the eleventh frequency component 660 Hz of the polarity reversal frequency of the liquid crystal and the fourth frequency component 660 Hz of the pulse frequency of the light source is 0 Hz in the group C containing the ninth through twelfth frequency components of the polarity reversal frequency of the liquid crystal. The level of the light power spectrum lowers as the frequency components in the group C of the ninth through twelfth components of the polarity reversal frequency of the liquid crystal become higher in order. Moreover, the level of the light power spectrum lowers as the frequency components of the pulse frequency of the light source become higher in order. More specifically, no consideration is needed to the scroll noise at the ninth or higher frequency components of the polarity reversal frequency of the liquid crystal and the fourth or higher frequency components of the pulse frequency of the light source.

As illustrated in FIG. 9B, a minimum of the difference values between the first frequency component of 165 Hz of the pulse frequency of the light source and each of the components within the group A containing the first through sixth components of the polarity reversal frequency of the liquid crystal is 15 Hz. A minimum of the difference values between the first frequency component of 165 Hz of the pulse frequency of the light source and each of the components within the groups A and B containing the first through eighth components of the polarity reversal frequency of the liquid crystal is 15 Hz. Moreover, a minimum of the difference values between the first frequency component of 165 Hz of the pulse frequency of the light source and each of the components within the groups A, B and C containing the first through twelfth components of the polarity reversal frequency of the liquid crystal is 15 Hz.

Similarly as illustrated in FIG. 9B, a minimum of the difference values between the second frequency component of 330 Hz of the pulse frequency of the light source and each of the components within the group A is 30 Hz. A minimum of the difference values between the second frequency component of 330 Hz of the pulse frequency of the light source and each of the components within the groups A and B is 30 Hz. Furthermore, a minimum of the difference values between the second frequency component of 330 Hz of the pulse frequency of the light source and each of the components within the groups A, B and C is 30 Hz. Generally, the same is true of the third frequency component of the pulse frequency of the light source.

Similarly as illustrated in FIG. 9B, a minimum of the difference values between the fourth frequency component of 660 Hz of the pulse frequency of the light source and each of the components within the group A is 300 Hz. A minimum of the difference values between the fourth frequency component of 660 Hz of the pulse frequency of the light source and each of the components within the groups A and B is 180 Hz. Furthermore, a minimum of the difference values between the fourth frequency component of 660 Hz of the pulse frequency of the light source and each of the components within the groups A, B and C is 0 Hz.

In accordance with one embodiment of the invention, the difference value between each of the frequency components of the polarity reversal frequency at which the polarity of the voltage applied to the liquid crystal of the electro-optic panel is reverse-driven and each of the frequency components of the pulse frequency at which the light source is pulse-driven is 15 Hz in the group A (60, 120, 180, 240, 300, and 360 Hz) and the group B (420 and 480 Hz). The difference values are unlikely to be lower than 14 Hz as a predetermined threshold value. The scroll noise or flickering, caused by synchronization or resonance between the polarity reversal frequency and the pulse frequency, and visually recognizable by human eyes is completely or almost completely controlled.

Figure 10:
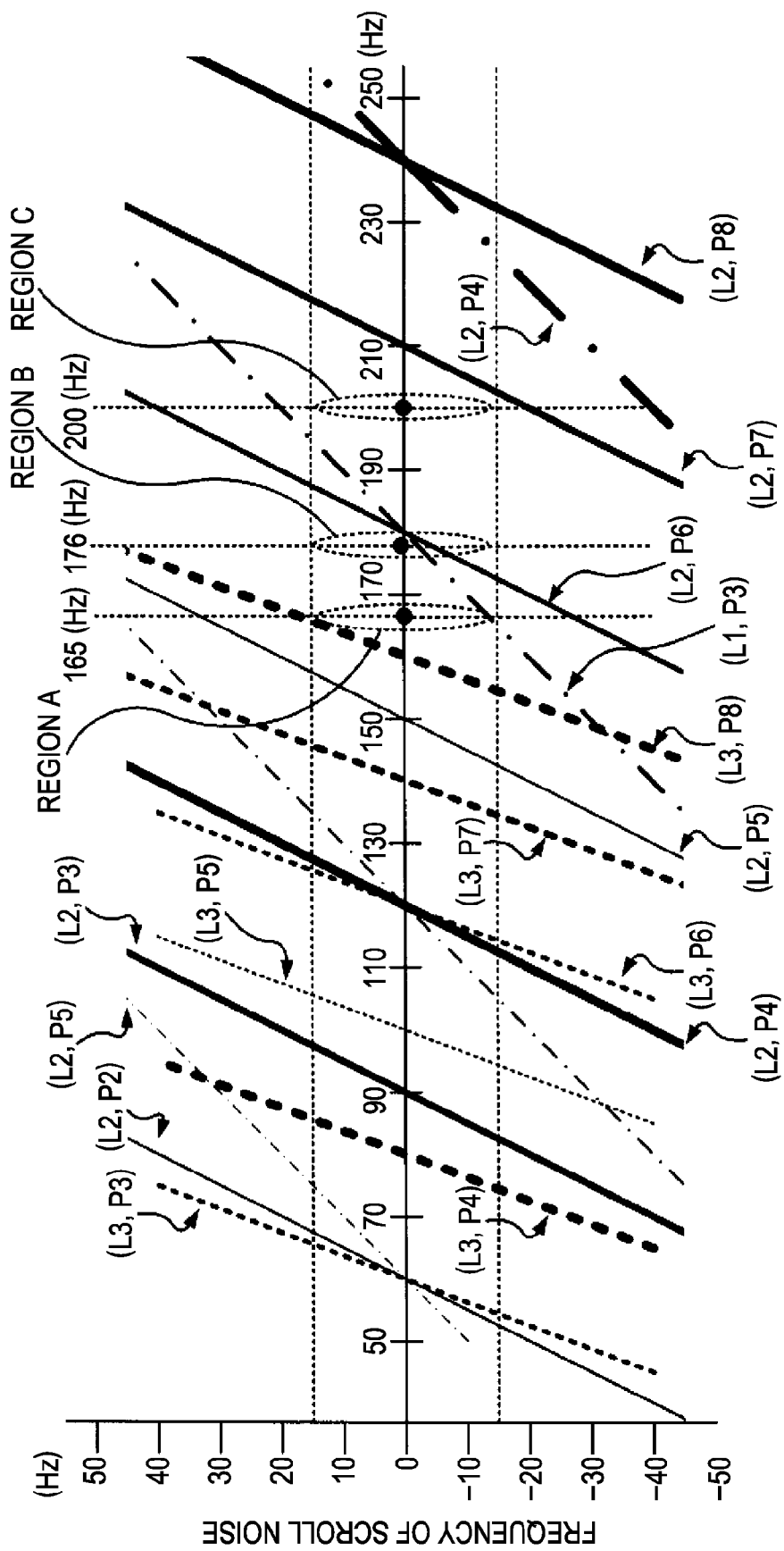
FIG. 10 is a plot of a quantitative relationship of the pulse frequency at which the light source is pulse-driven, the polarity reversal frequency at which the polarity of the voltage applied to the liquid crystal of the liquid-crystal panel is reverse-driven, and the frequency of the generated scroll noise in accordance with one embodiment of the invention.

Relationship of the Pulse Frequency of the Light Source, the Polarity Reversal Frequency of the Liquid Crystal, and the Frequency of the Scroll Noise Described with reference to FIG. 10 is a quantitative relationship of the pulse frequency of the light source, the polarity reversal frequency of the liquid crystal, and the frequency of the scroll noise. FIG. 10 is a plot of the quantitative relationship of the pulse frequency at which the light source is pulse-driven, the polarity reversal frequency at which the polarity of the voltage applied to the liquid crystal of the liquid-crystal panel is reverse-driven, and the frequency of the generated scroll noise in accordance with one embodiment of the invention. As illustrated in FIG. 10, the abscissa represents the value of the pulse frequency of the light source and the ordinate represents the frequency of the scroll noise. With reference to FIG. 10, it is known that the scroll noise remains stationary on the screen when the frequency of the scroll noise is zero, that the scroll noise shifts downward on the screen when the frequency of the scroll noise has a negative value, and that the scroll noise shifts upward on the screen when the frequency of the scroll noise has a positive value.

With reference to FIG. 10, lines represent frequencies of scroll noise generated in response to the order of the pulse frequency of the light source and the order of the polarity reversal frequency of the liquid crystal. A combination of the order number of the pulse frequency of the light source and the order number of the polarity reversal frequency of the liquid crystal is represented by "(Ln,Pm)" for convenience (n and m are natural numbers).

The pulse frequency of 165 Hz of the light source in an area A in FIG. 10 is now considered. A line (L3, P8) having a third order as the order number of the pulse frequency and an eighth order as the order number of the polarity reversal frequency of the electro-optic panel intersects the pulse frequency of 165 Hz in the vicinity of a frequency of 15 Hz of the scroll noise. This corresponds to the value group X2 illustrated in FIG. 9A. With the pulse frequency of 165 Hz of the light source, a line (L1, P3) having a first order as the order number of the pulse frequency and a third order as the order number of the polarity reversal frequency of the electro-optic panel intersects the pulse frequency of 165 Hz in the vicinity of a frequency of −15 Hz of the scroll noise. This corresponds to the value group X1 illustrated in FIG. 9A.

In other words, as illustrated in the area A in FIG. 10, no or little scroll noise having an absolute frequency value being lower than 14 Hz as one example of a predetermined threshold value is generated if the pulse frequency of the light source is set to be 165 Hz. Generally, a scroll noise having a frequency lower than 14 Hz as one example of the threshold value, if generated, is visually recognized by human eyes.

The above conclusion is substantiated by the plot of FIG. 10 in which a line (L2, P5) having a second order as the order number of the pulse frequency and a fifth order as the order number of the polarity reversal frequency of the electro-optic panel intersects the pulse frequency of 165 Hz in the vicinity of a frequency of 30 Hz of the scroll noise. Furthermore, the above conclusion is substantiated by the plot of FIG. 10 in which a line (L2, P6) having a second order as the order number of the pulse frequency and a sixth order as the order number of the polarity reversal frequency of the electro-optic panel intersects the pulse frequency of 165 Hz in the vicinity of a frequency of −30 Hz of the scroll noise.

In one embodiment of the invention, the frequency component of the polarity reversal frequency of the liquid crystal is an integer multiple of 60 Hz and the frequency component of the pulse frequency of the light source is an integer multiple of 165 Hz. The absolute value of the difference value between the frequency component of the polarity reversal frequency and the frequency component of the pulse frequency at which the light source is pulse-driven is greater than 15 Hz. There is no or little possibility that the absolute value of the difference value is smaller than 14 Hz as one example of the predetermined threshold value. The scroll noise or flicing visually recognizable by human eyes is thus prevented from being generated by synchronization or resonance between the polarity reversal frequency and the pulse frequency.

Effect of the Scroll Noise and Flickering

Figure 11:
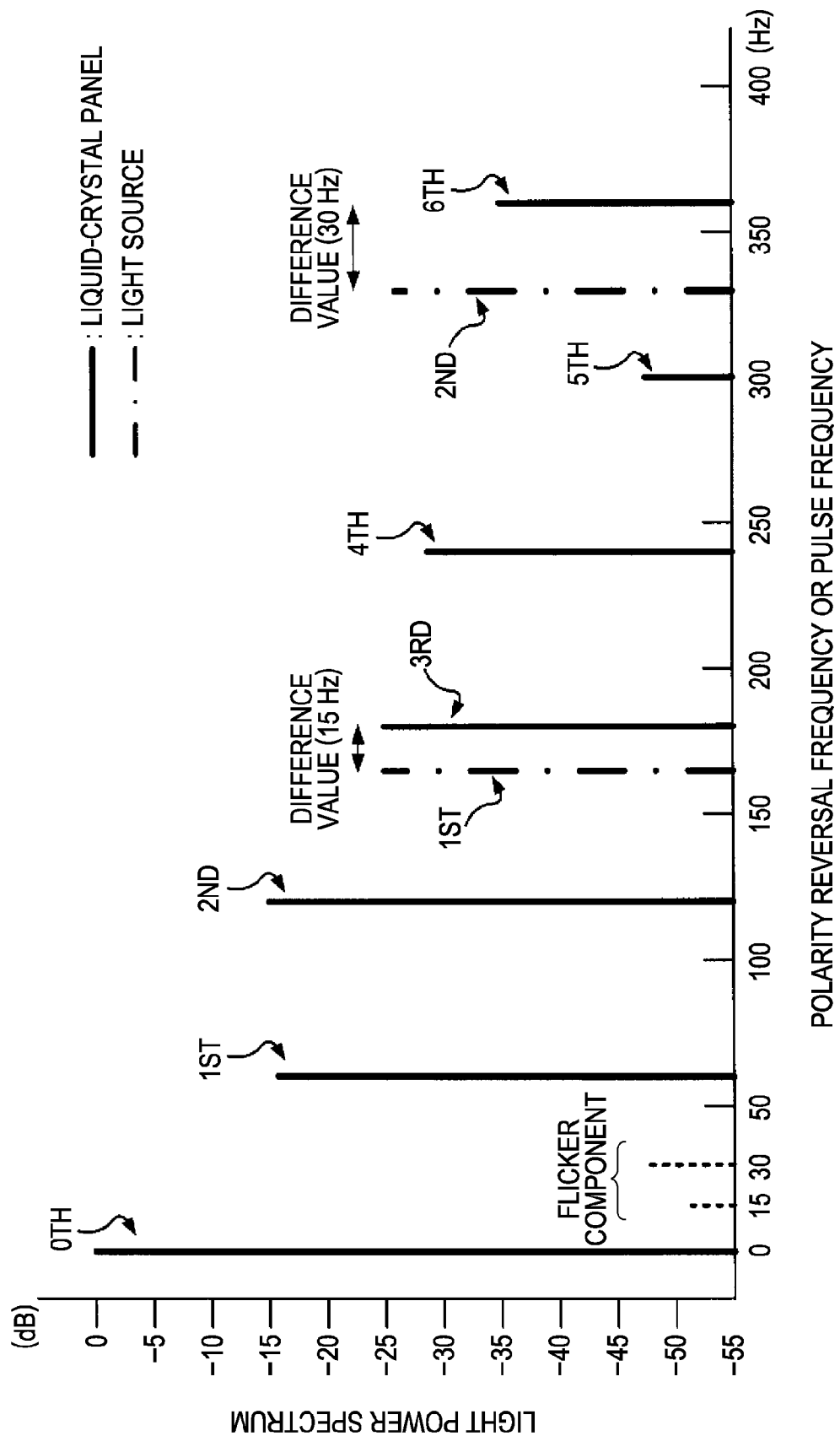
FIG. 11 is a plot of a quantitative relationship of a light power spectrum of a frequency component of the polarity reversal frequency of the liquid crystal, a light power spectrum of the frequency component of the pulse frequency of the light source, and a light power spectrum of a flicker component caused by the scroll noise in accordance with one embodiment of the invention.

The effect of the scroll noise generated in one embodiment of the invention is described below with reference to FIG. 11. FIG. 11 is a plot of a quantitative relationship of a light power spectrum of a frequency component of the polarity reversal frequency of the liquid crystal, a light power spectrum of the frequency component of the pulse frequency of the light source, and a light power spectrum of a flicker component caused by the scroll noise in accordance with one embodiment of the invention. In FIG. 11, the abscissa represents the value of one of the polarity reversal frequency and the pulse frequency and the ordinate represents the value of light power spectrum.

Referring to FIG. 11, the frequency components of the polarity reversal frequency of the liquid crystal of the electro-optic panel contain light power spectral values of 0 dB, −16 dB, −15 dB, −25 dB, −29 dB, −47 dB, and −33 dB at zero order 0 Hz, the first frequency 60 Hz, the second frequency 120 Hz, the third frequency 180 Hz, the fourth frequency 240 Hz, the fifth frequency 300 Hz, and the sixth frequency 360 Hz, respectively.

The frequency components of the pulse frequency of the light source contain light power spectral values of −25 dB and −26 dB at the first frequency 165 Hz and the second frequency 330 Hz, respectively.

The difference value between the third frequency component 180 Hz of the polarity reversal frequency of the electro-optic panel and the first frequency component 165 Hz of the pulse frequency of the light source is 15 Hz as described above. A flicker component as high as about −50 dB light power spectral value is generated at 15 Hz along the abscissa in FIG. 11 in response to the scroll noise. This flicker component is not lower than in frequency than 14 Hz as one example of the predetermined threshold value. The flicker component is not only higher in frequency than 14 Hz and but also has a value of about −50 dB which is substantially lower than the light power spectrum of the first frequency component of the electro-optic panel. The flicker component is unlikely to be visually recognized by human eyes. The value of −50 dB serves as a predetermined value of the light power spectrum in accordance with embodiments of the invention.

Furthermore, as described above, the difference value between the sixth frequency component 360 Hz of the polarity reversal frequency of the electro-optic panel and the second frequency component 330 Hz of the pulse frequency of the light source is 30 Hz as described above. A flicker component as high as about −47 dB light power spectral level is generated at about 30 Hz along the abscissa in FIG. 11 in response to the scroll noise. Also, this flicker component is not lower than in frequency than 14 Hz as one example of the predetermined threshold value. The flicker component is not only higher in frequency than 14 Hz and but also has a level of about −47 dB which is substantially lower than the light power spectrum of the first frequency component of the electro-optic panel. The flicker component is unlikely to be visually recognized by human eyes. The level of −47 dB serves as another predetermined value of the light power spectrum in accordance with embodiments of the invention The above arrangement completely or almost completely prevents scroll noise or flickering visually recognizable by human eyes from being generated as a result of synchronization or resonance between the polarity reversal frequency and the pulse frequency. A high-quality image is thus displayed.

Operation and Effects of Embodiments

Operation and effects of the embodiments of the invention are described below with reference to FIG. 10 together with FIGS. 12 and 13. FIG. 12A is a table listing difference values between frequency components of a polarity reversal frequency of the liquid crystal and frequency components of the pulse frequency of the light source in accordance with a comparative example and FIG. 12B is a table listing minimum values of the difference values on a per group basis of the frequency components of the polarity reversal frequency of the liquid crystal in accordance with the comparative example. FIG. 13 is a plot of a quantitative relationship of a light power spectrum of a frequency component of the polarity reversal frequency of the liquid crystal, a light power spectrum of the frequency component of the pulse frequency of the light source, and a light power spectrum of a flicker component caused by the scroll noise in accordance with the comparative example. In FIG. 13, the abscissa represents the value of one of the polarity reversal frequency and the pulse frequency and the ordinate represents the value of the light power spectrum.

If the pulse frequency of the light source is 176 Hz as illustrated in FIGS. 12A and 13, the difference value between the third frequency component 180 Hz of the polarity reversal frequency of the electro-optic panel and the first frequency component 176 Hz of the pulse frequency of the light source becomes 4 Hz. A scroll noise lower in frequency than 14 Hz as one example of the predetermined threshold value is thus generated and visually recognized by human eyes. In other words, a flicker component as high as about −46 dB light power spectral value is generated at 4 Hz along the abscissa in FIG. 13 in response to the scroll noise and then visually recognized by human eyes.

The difference value between the sixth frequency component 360 Hz of the polarity reversal frequency of the electro-optic panel and the second frequency component 352 Hz of the pulse frequency of the light source becomes 8 Hz as illustrated in FIGS. 12A and 13. A scroll noise lower in frequency than 14 Hz as one example of the predetermined threshold value is thus generated and visually recognized by human eyes. In other words, a flicker component as high as about −40 dB light power spectral value is generated at 4 Hz along the abscissa in FIG. 13 in response to the scroll noise and then visually recognized by human eyes.

Referring to FIG. 12B, a minimum of the difference values between the first frequency component 176 Hz of the pulse frequency of the light source and each of the components in the groups A, B, and C from the first through twelfth components of the polarity reversal frequency of the liquid crystal is 4 Hz. Also, referring to FIG. 12B, a minimum of the difference values between the second frequency component 352 Hz of the pulse frequency of the light source and each of the components in the groups A, B, and C is 8 Hz.

If the pulse frequency of the light source is 176 Hz as illustrated in an area B in FIG. 10, a line (L1, P3) having a first order as the order number of the pulse frequency and a third order as the order number of the polarity reversal frequency of the electro-optic panel intersects the pulse frequency of 176 Hz in the vicinity of a frequency of −4 Hz of the scroll noise. This corresponds to a value group Y1 of FIG. 12A.

If the pulse frequency of the light source is 176 Hz, a scroll noise having the absolute value of the frequency thereof lower in frequency than 14 Hz as one example of the predetermined threshold value is generated and thus visually recognized by human eyes.

If the pulse frequency of the light source is 176 Hz as illustrated in the area B in FIG. 10, a line (L2, P6) having a second order as the order number of the pulse frequency and a sixth order as the order number of the polarity reversal frequency of the electro-optic panel intersects the pulse frequency of 176 Hz in the vicinity of a frequency of −8 Hz of the scroll noise. This corresponds to a value group Y2 of FIG. 12A.

In accordance with one embodiment of the invention in contrast, the pulse frequency of the light source is 165 Hz and the polarity reversal frequency of the electro-optic panel is 60 Hz. The frequency components of the pulse frequency of the light source and the polarity reversal frequency of the electro-optic panel are set so that the difference value between each of the plurality of frequency components of the pulse frequency of the light source and each of the plurality of frequency components of the polarity reversal frequency of the electro-optic panel is higher than the predetermined threshold value. The above arrangement completely or almost completely prevents scroll noise or flickering visually recognizable by human eyes from being generated as a result of synchronization or resonance between the polarity reversal frequency and the pulse frequency.

Second Embodiment

Figure 15:
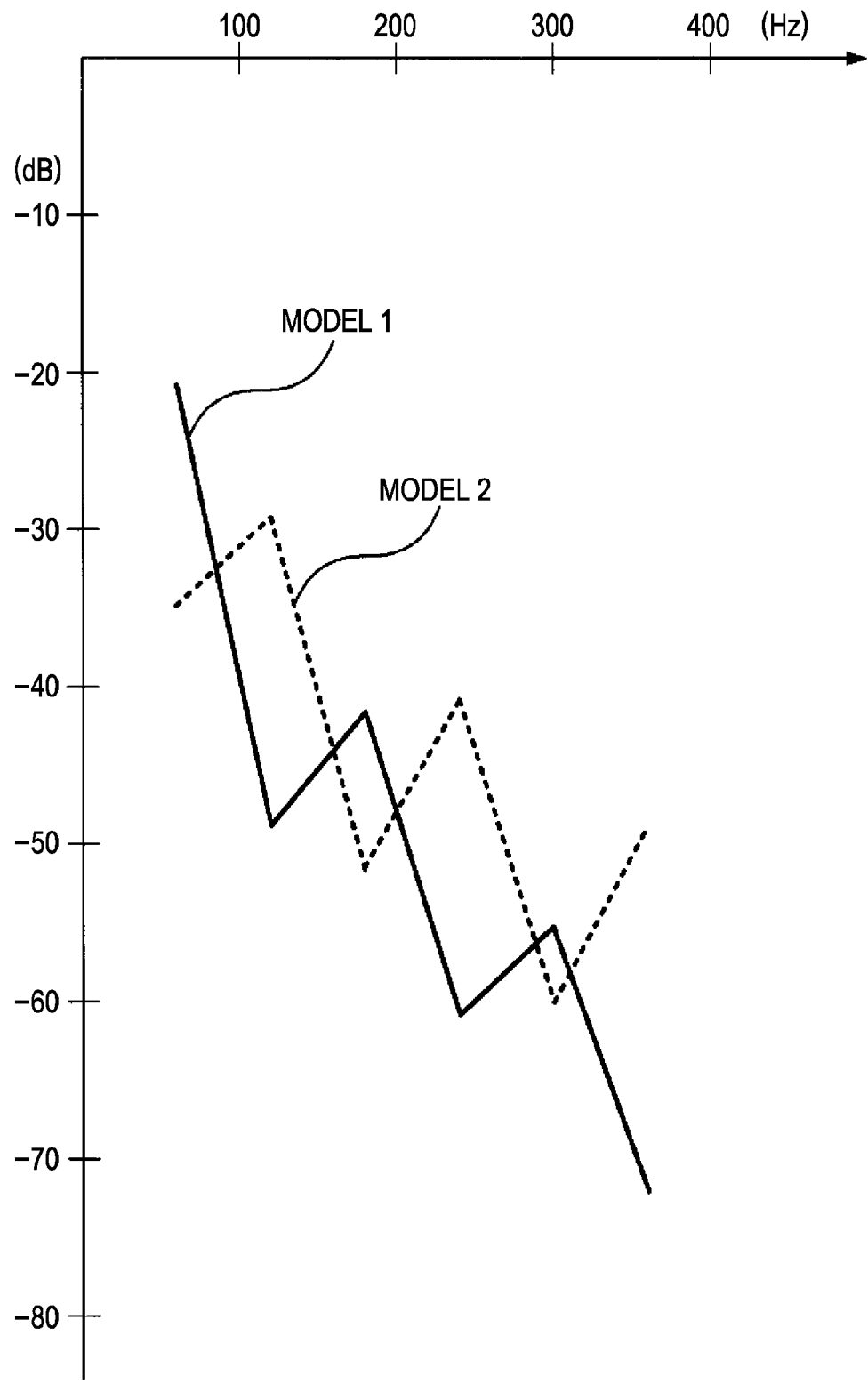
FIG. 15 is a plot of a quantitative relationship between the frequency component of the polarity reversal frequency of the liquid crystal and the light power spectrum of the frequency component in accordance with the second embodiment of the invention.

Another example of the difference value between the polarity reversal frequency and the pulse frequency is described below with reference to FIGS. 14A and 14B and 15. FIG. 14A is a table listing difference values between frequency components of a polarity reversal frequency of the liquid crystal and frequency components of the pulse frequency of the light source in accordance with a second embodiment of the invention and FIG. 14B is a table listing minimum values of the difference values on a per group basis of the frequency components of the polarity reversal frequency of the liquid crystal in accordance with the second embodiment of the invention.

If the frequency components of the polarity reversal frequency at which the polarity of the voltage applied to the liquid crystal of the electro-optic panel are set based on 60 Hz in accordance with the second embodiment of the invention as illustrated in FIG. 14A, the frequency components of the pulse frequency at which the light source is pulse-driven are set based on 200 Hz. More specifically, the frequency components of the polarity reversal frequency of the electro-optic panel of the second embodiment of the invention are integer multiples of 60 Hz of the first to twelfth orders, i.e., 60, 120, 180, . . . , 540, 600, 660, and 720 Hz. The frequency components of the pulse frequency of the light source are integer multiples of 200 Hz of the first through fourth orders, i.e., 200, 400, 600, and 800 Hz. Each of the plurality of frequency components of the polarity reversal frequency of the electro-optic panel is compared with each of the plurality of the frequency components of the pulse frequency of the light source. A difference value is thus calculated as listed in the table in FIG. 14A.

Referring to FIGS. 14A and 14B, a minimum of the difference values between the first frequency component of 200 Hz of the pulse frequency of the light source and each of the components within the groups A, B and C containing the first through twelfth components of the polarity reversal frequency of the liquid crystal is 20 Hz.

Similarly, referring to FIGS. 14A and 14B, a minimum of the difference values between the second frequency component of 400 Hz of the pulse frequency of the light source and each of the components within the groups A, B and C is 20 Hz.

Similarly, referring to FIGS. 14A and 14B, a minimum of the difference values between the third frequency component of 600 Hz of the pulse frequency of the light source and each of the components within the groups A and B is 120 Hz. Moreover, a minimum of the difference values between the third frequency component of 600 Hz of the pulse frequency of the light source and each of the components within the group C is 0 Hz. The level of the light power spectrum lowers as the frequency components of the polarity reversal frequency of the liquid crystal become higher in order. More specifically, no consideration is needed to the scroll noise at the ninth or higher frequency components of the polarity reversal frequency of the liquid crystal and the fourth or higher frequency components of the pulse frequency of the light source. FIG. 15 quantitatively illustrates that the level of the light power spectrum lowers in the electronic apparatus containing two models of liquid-crystal devices as the frequency components of the polarity reversal frequency of the liquid crystal become higher in order.

Similarly, referring to FIGS. 14A and 14B, a minimum of the difference values between the fourth frequency component of 800 Hz of the pulse frequency of the light source and each of the components within the groups A, B and C is 80 Hz.

In accordance with the second embodiment of the invention, the frequency components of the polarity reversal frequency of the liquid crystal are integer multiples of 60 Hz and the frequency components of the pulse frequency of the light source are integer multiples of 200 Hz. Each difference value between each of the frequency components of the polarity reversal frequency and each of the frequency components of the light source is higher in frequency than 20 Hz and unlikely to become lower than 14 Hz as one example of the predetermined threshold value over the range of from the first through the eighth orders of the polarity reversal frequency. The above arrangement completely or almost completely prevents scroll noise or flickering visually recognizable by human eyes from being generated as a result of synchronization or resonance between the polarity reversal frequency and the pulse frequency.

The frequency component of the polarity reversal frequency of the liquid crystal is an integer multiple of 60 Hz and the frequency component of the pulse frequency of the light source is an integer multiple of 200 Hz as represented by the area C in FIG. 10 in accordance with the second embodiment of the invention. A line (L1, P3) having a first order as the order number of the pulse frequency and a third order as the order number of the polarity reversal frequency of the electro-optic panel intersects the pulse frequency of 200 Hz in the vicinity of a frequency of 20 Hz of the scroll noise. This corresponds to a value group Y1 of FIG. 14A. Furthermore, with the pulse frequency 200 Hz of the light source, a line (L2, P7) having a second order as the order number of the pulse frequency and a seventh order as the order number of the polarity reversal frequency of the electro-optic panel intersects the pulse frequency of 200 Hz in the vicinity of a frequency of −20 Hz of the scroll noise. This corresponds to a value group Y2 of FIG. 14A. In other words, the pulse frequency and the polarity reversal frequency of the liquid crystal, preventing the scroll noise and flickering from being generated, may be learned from FIG. 10 that is the plot of the quantitative relationship of the pulse frequency at which the light source is pulse-driven, the polarity reversal frequency at which the polarity of the voltage applied to the liquid crystal of the liquid-crystal panel is reverse-driven, and the frequency of the generated scroll noise in accordance with one embodiment of the invention.

Third Embodiment

Another example of the difference value between the polarity reversal frequency and the pulse frequency is described below with reference to FIGS. 16A and 16B and 17A and 17B. FIG. 16A is a table listing difference values between frequency components of a polarity reversal frequency of the liquid crystal and frequency components of the pulse frequency of the light source in accordance with a third embodiment of the invention and FIG. 16B is a table listing minimum values of the difference values on a per group basis of the frequency components of the polarity reversal frequency of the liquid crystal in accordance with the third embodiment of the invention. FIG. 17A is a table listing difference values between frequency components of a polarity reversal frequency of the liquid crystal and frequency components of the pulse frequency of the light source in accordance with a comparative example and FIG. 17B is a table listing minimum values of the difference values on a per group basis of the frequency components of the polarity reversal frequency of the liquid crystal in accordance with the comparative example.

With reference to FIGS. 16A and 16B, a minimum of the difference values of the first frequency component 165 Hz of the pulse frequency of the light source and each of the frequency components of the polarity reversal frequency of the liquid crystal in the groups A, B, and C of the first through twelfth orders, i.e., 50, 100, 150, . . . , 450, 500, 550, and 600 Hz is 15 Hz. The frequency of an integer multiple of 50 Hz serve as the frequency of the PAL system in accordance with one embodiment of the invention.

Similarly, with reference to FIGS. 16A and 16B, a minimum of the difference value between the second frequency component 330 Hz of the pulse frequency of the light source and each of the frequency components in the groups A, B, and C is 20 Hz.

Similarly, with reference to FIGS. 16A and 16B, a minimum of the difference value between the third frequency component 495 Hz of the pulse frequency of the light source and each of the frequency components in the groups A, B, and C is 5 Hz. As illustrated in FIG. 15, the level of the light power spectrum lowers as the frequency components of the polarity reversal frequency of the liquid crystal become higher in order. Furthermore, the level of the light power spectrum lowers as the frequency components of the pulse frequency of the light source become higher in order. More specifically, no consideration is needed to the scroll noise at the ninth or higher frequency components of the polarity reversal frequency of the liquid crystal and the fourth or higher frequency components of the pulse frequency of the light source.

Similarly, with reference to FIGS. 16A and 16B, a minimum of the difference value between the fourth frequency component 660 Hz of the pulse frequency of the light source and each of the frequency components in the groups A, B, and C is 60 Hz.

In accordance with the third embodiment of the invention, the frequency components of the polarity reversal frequency of the liquid crystal are integer multiples of 60 Hz and the frequency components of the pulse frequency of the light source are integer multiples of 200 Hz. Each difference value between each of the frequency components of the polarity reversal frequency and each of the frequency components of the light source is unlikely to become lower than 14 Hz as one example of the predetermined threshold value over the range of from the first through the eighth orders of the polarity reversal frequency. The above arrangement completely or almost completely prevents scroll noise or flickering visually recognizable by human eyes from being generated as a result of synchronization or resonance between the polarity reversal frequency and the pulse frequency.

The pulse frequency 165 Hz of the light source can prevent the scroll noise and flickering from being generated based on the polarity reversal frequency of 50 Hz of the liquid crystal in the PAL system and the polarity reversal frequency of 60 Hz of the liquid crystal in the NTSC system described with reference to FIGS. 9A and 9B.

In the comparative example illustrated in FIGS. 17A and 17B, the frequency components of the polarity reversal frequency of the liquid crystal are integer multiples of 50 Hz and the frequency components of the pulse frequency of the light source are integer multiples of 200 Hz. A minimum of the difference values of the first frequency component 200 Hz of the pulse frequency of the light source and each of the frequency components of the polarity reversal frequency of the liquid crystal in the groups A, B, and C of the first through twelfth orders, i.e., 50, 100, 150, 450, 500, 550, and 600 Hz is 0 Hz. The scroll noise lower in frequency than 14 Hz as one example of the predetermined threshold value is generated and then visually recognized by human eyes. More specifically, the scroll noise stationary on the screen as illustrated in FIGS. 7 and 8A and 8B is thus generated.

Electronic Apparatus

Figure 18:
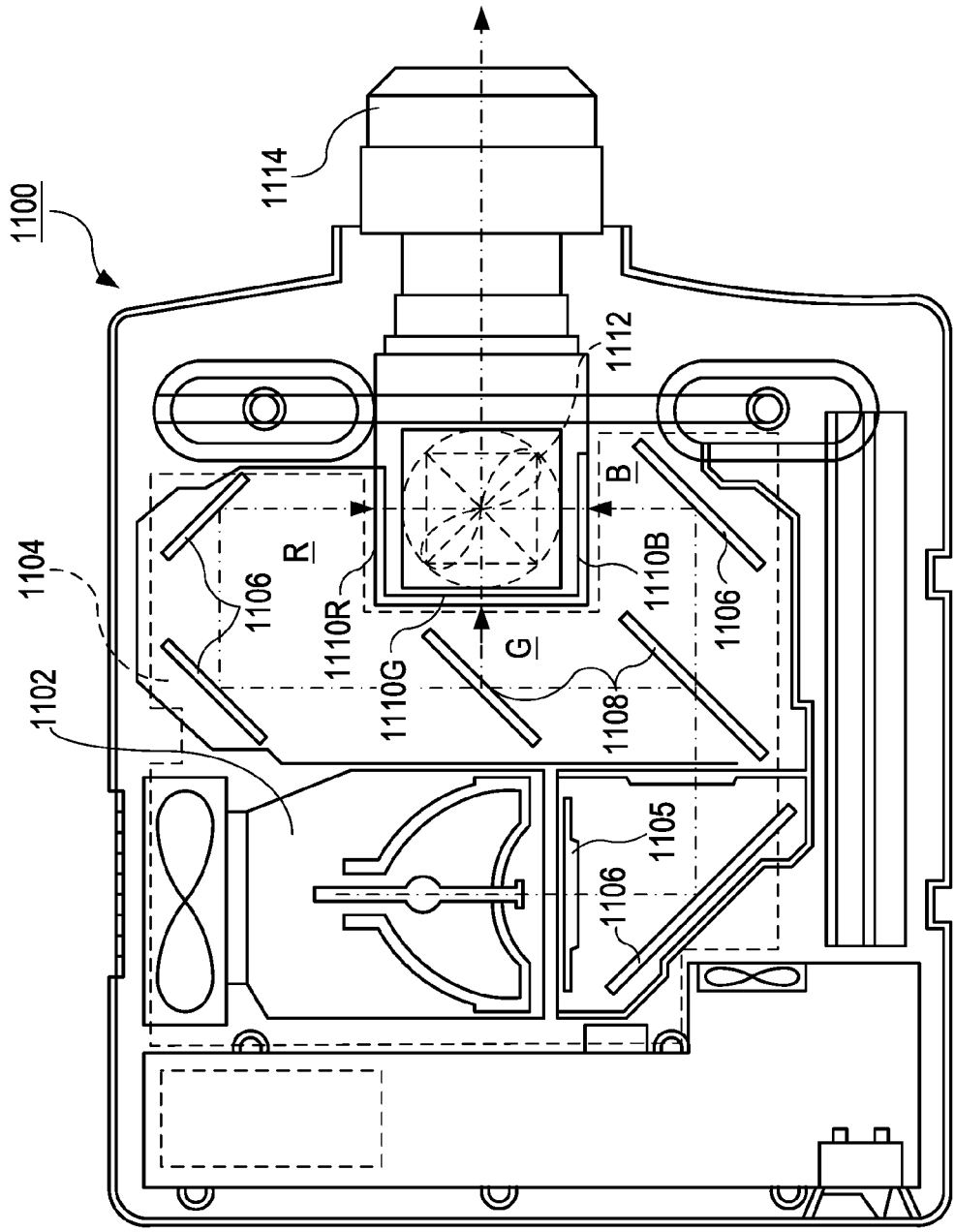
FIG. 18 is a plan view of a projector in accordance with one embodiment of the invention.

The electronic apparatus of one embodiment of the invention is described below with reference to FIG. 18. The electronic apparatus herein is a projector 1100 that employs a liquid-crystal device (electro-optic device) as a light valve. FIG. 18 is a plan view of the projector. In the discussion that follows, some of the elements previously described are omitted.

Referring to FIG. 18, the projector 1100 includes a lamp unit 1102 having a white light source such as a halogen lamp. A light beam emitted from the lamp unit 1102 is adjusted by an aperture 1105 to an appropriate light level. The light beam is then separated into the three RGB color light rays through four mirrors 1106 and two dichroic mirrors 1108, arranged within a light guide 1104. The three RGB light rays are then respectively incident on liquid-crystal panels 1110R, 1110B, and 1110G as light valves for the RGB.

The liquid-crystal panels 1110R, 1110B, and 1110G are identical in structure to the above-described liquid-crystal device and driven by three RGB color signals supplied from an video signal processor circuit. The light rays modulated by the electro-optic panels are incident on a dichroic prism 1112 from three directions. The dichroic prism 1112 allows the R and G light rays to be refracted at right angles while causing the G light ray to travel straight. The color images are thus synthesized into a color image, which is then projected onto a screen or the like through a projection lens 1114.

As for the display images of the liquid-crystal panels 1110R, 1110B, and 1110G, the display image of the liquid-crystal panel 1110G needs to be right-left reversed in relation to the images of the liquid-crystal panels 1110R and 1110B.

Since the liquid-crystal panels 1110R, 1110B, and 1110G receive the light rays responsive to the RGB colors via the dichroic mirrors 1108, no color filters are required.

In addition to the electronic apparatus illustrated in FIG. 18, the electro-optic device of embodiments of the invention is applicable to a variety of electronic apparatuses. Such electronic apparatuses include a mobile personal computer, a cell phone, a liquid-crystal television receiver, a view-finder type video cassette recorder, a direct-monitor-viewing type video cassette recorder, a car navigation system, a pager, an electronic notebook, a calculator, a wordprocessor, a workstation, a video phone, a point-of-sale (POS) terminal, and a touchpanel.

The invention is not limited to the above-described embodiments. A variety of changes and modifications are possible to the above-described embodiments without departing from the spirit and scope of the invention. An electro-optic device incorporating such a change and modification and an electronic apparatus containing the electro-optic device also falls within the scope of the invention.

The entire disclosure of Japanese Patent Application No. 2008-067202, filed Mar. 17, 2008 is expressly incorporated by reference herein.

What is claimed is:

1. An electro-optic device, comprising:
    an electro-optic panel that includes a pixel region having a plurality of pixels that are arranged at a plurality of intersections where a plurality of scanning lines and a plurality of data lines cross each other;
    a polarity reverser that reverses, at a first frequency, a polarity, with respect to a common voltage, of video signals that are supplied to the plurality of pixels;
    a light source that emits light onto the pixel region;
    a pulse driver that pulse-drives the light source at a second frequency that is not a multiple of the first frequency; and
    a setter that sets the first frequency and the second frequency so that a difference value between each of a plurality of first frequency components of the first frequency and each of a plurality of second frequency components of the second frequency is greater than a predetermined threshold value,
    wherein the predetermined threshold value is not less than 14 Hz, and
    wherein the first frequency is not a multiple of the second frequency.

2. The electro-optic device according to claim 1, wherein the first frequency is one of a frame frequency and a field frequency.

3. The electro-optic device according to claim 1, wherein the first frequency is one of a frequency of the NTSC system and a frequency of the PAL system.

4. The electro-optic device according to claim 1, wherein the setter sets the second frequency so that the difference value between each of the plurality of first frequency components of the frequency of the NTSC system and each of the plurality of second frequency components is greater than the predetermined threshold value and further sets the second frequency so that the difference between each of the plurality of first frequency components of the frequency of the PAL system and each of the plurality of second frequency components is greater than the predetermined threshold value.

5. The electro-optic device according to claim 1, wherein a light power of the first frequency component is higher than a predetermined value.

6. An electro-optic device, comprising:
    an electro-optic panel that includes a pixel region having a plurality of pixels that are arranged at a plurality of intersections where a plurality of scanning lines and a plurality of data lines cross each other;
    a polarity reverser that reverses, at a first frequency, a polarity, with respect to a common voltage, of video signals that are supplied to the plurality of pixels;
    a light source that emits light onto the pixel region; and
    a pulse driver that pulse-drives the light source at a second frequency that is not a multiple of the first frequency,
    wherein the first frequency is not a multiple of the second frequency.

7. The electro-optic device according to claim 6, wherein a difference value between each of a plurality of first frequency components of the first frequency and each of a plurality of second frequency components of the second frequency is greater than a predetermined threshold value,
    wherein the predetermined threshold value is not less than 14 Hz.

* * * * *